Figure 33:
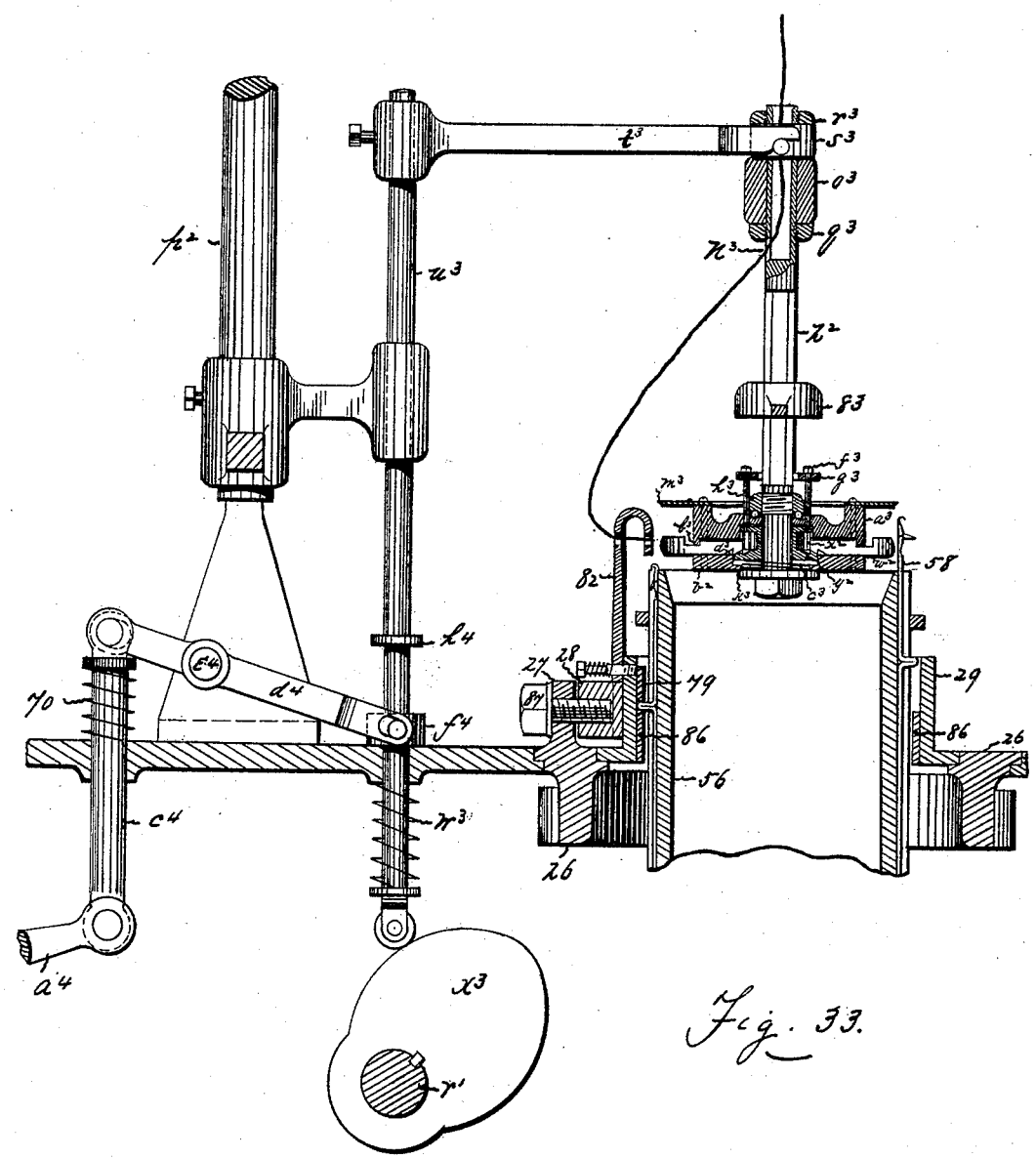

(No Model.) 14 Sheets—Sheet 1.
G. J. & W. L. CATHCART.
W. CATHCART, Administrator of G. J. CATHCART, deceased.
CIRCULAR KNITTING MACHINE.
No. 395,214. Patented Dec. 25, 1888.
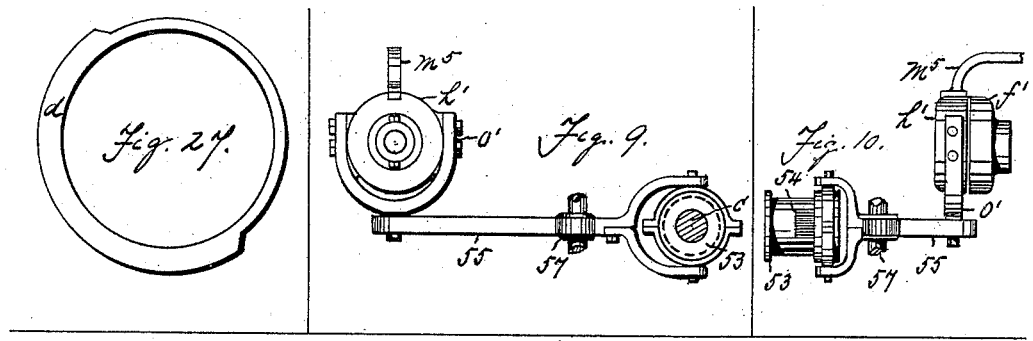
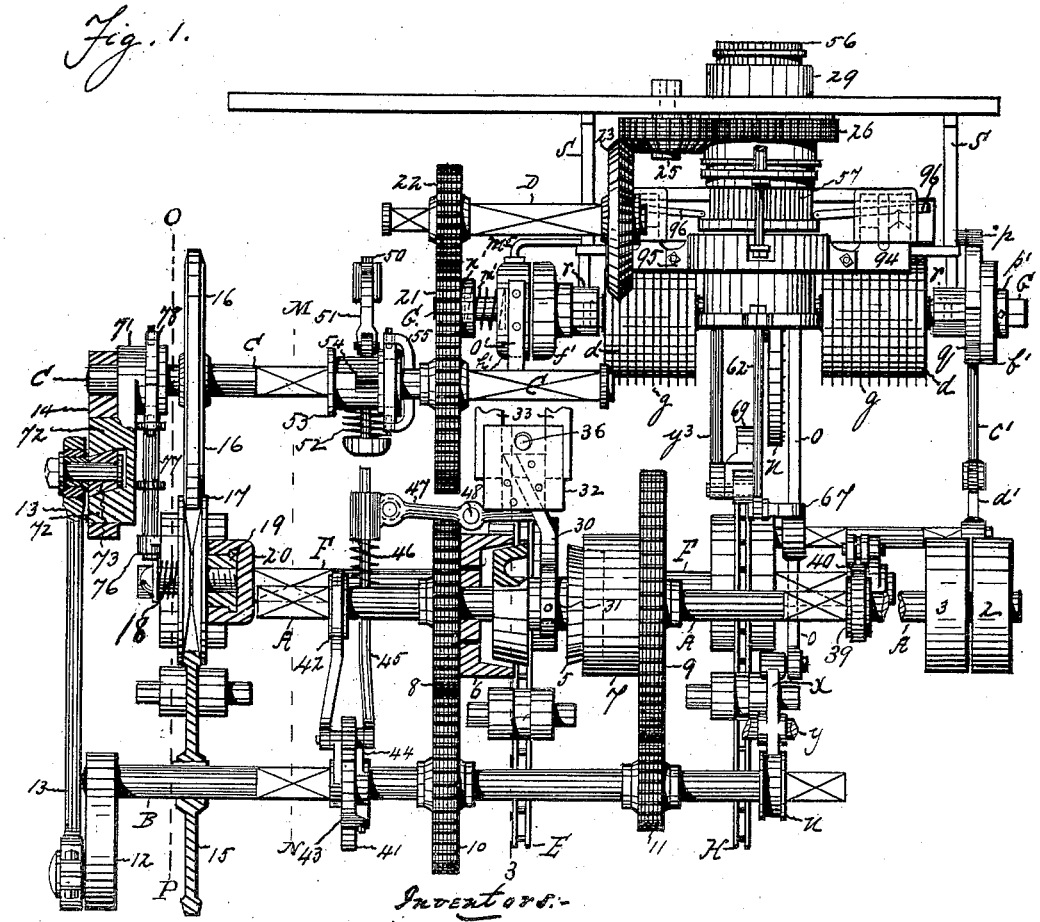

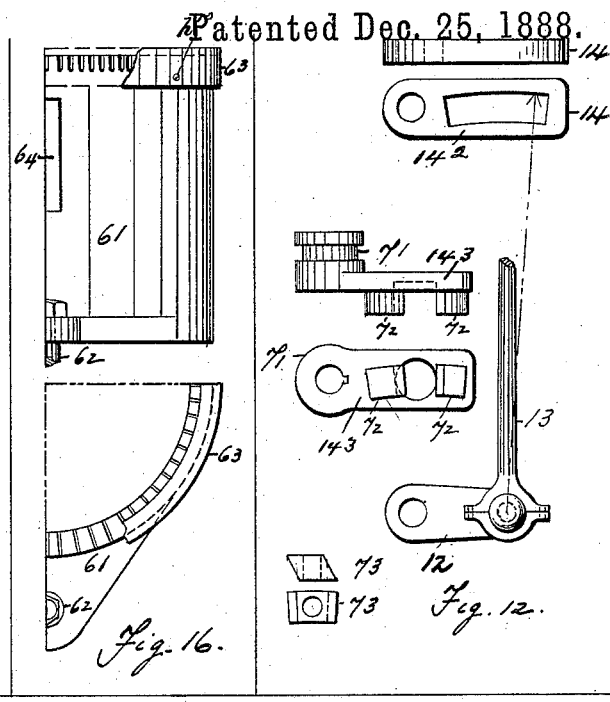

(No Model.) 14 Sheets—Sheet 3.
G. J. & W. L. CATHCART.
W. CATHCART, Administrator of G. J. CATHCART, deceased.
CIRCULAR KNITTING MACHINE.
No. 395,214. Patented Dec. 25, 1888.
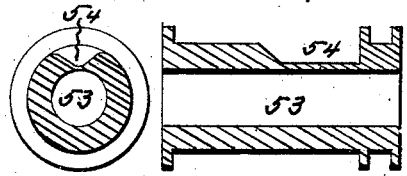
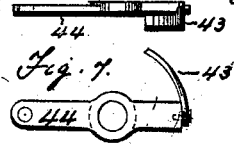
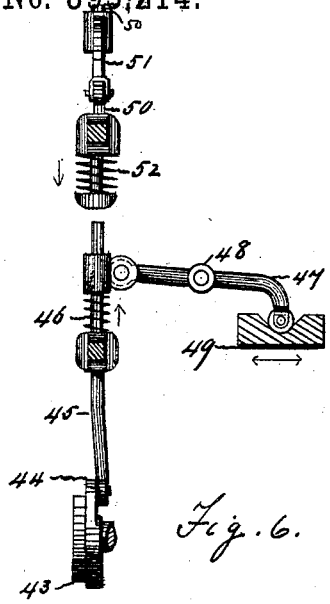
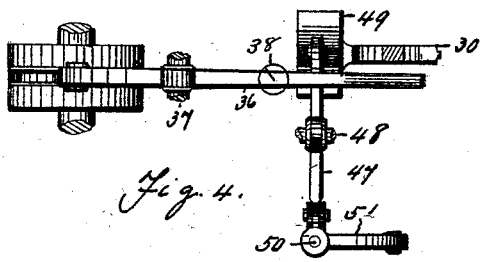
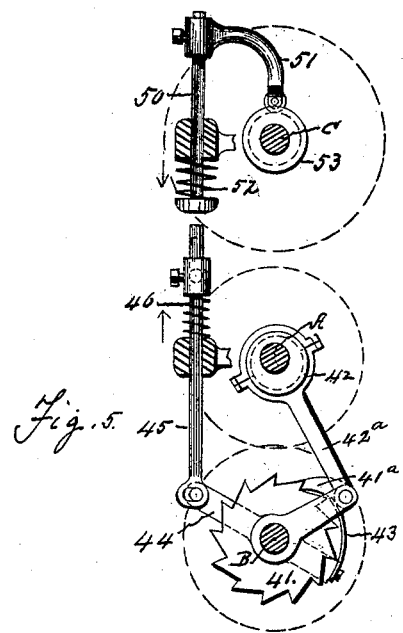
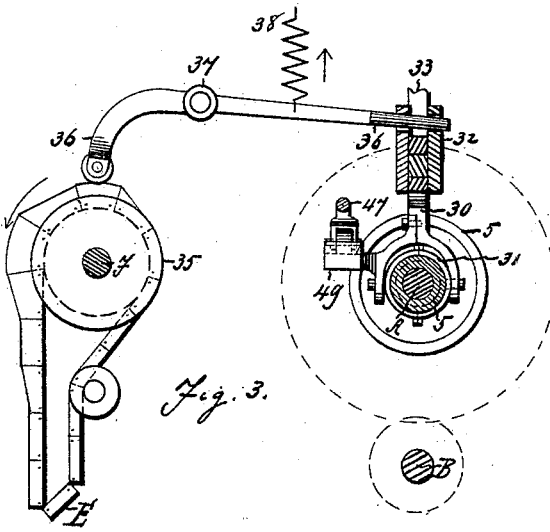
Witnesses:—
Mamie D. Cathcart.
Alexander T. Cathcart
Inventors:—
William Cathcart
Administrator of estate of
Gilbert J. Cathcart,
Dec'd,
William L. Cathcart.
N. PETERS, Photo-Lithographer, Washington, D. C.

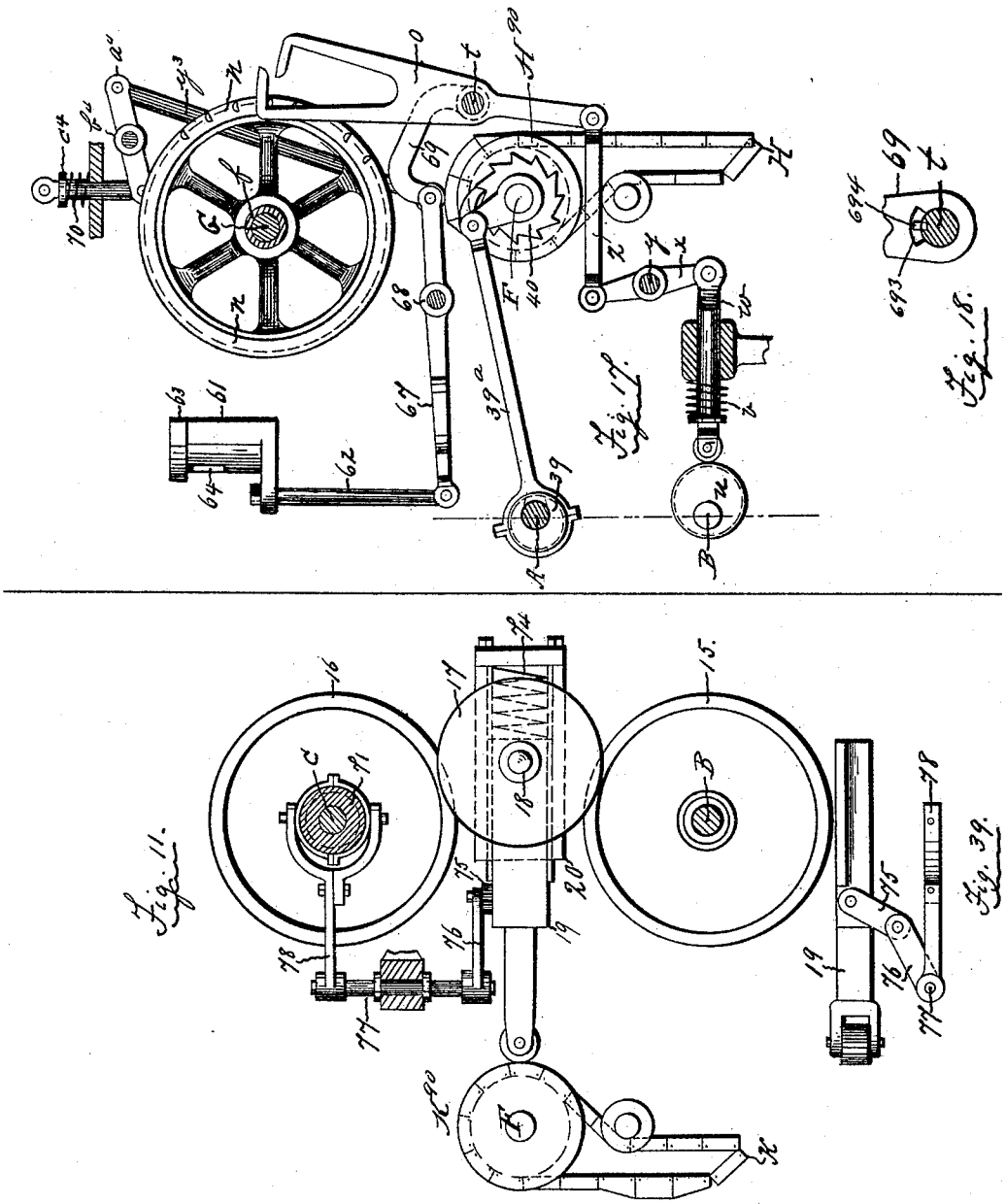

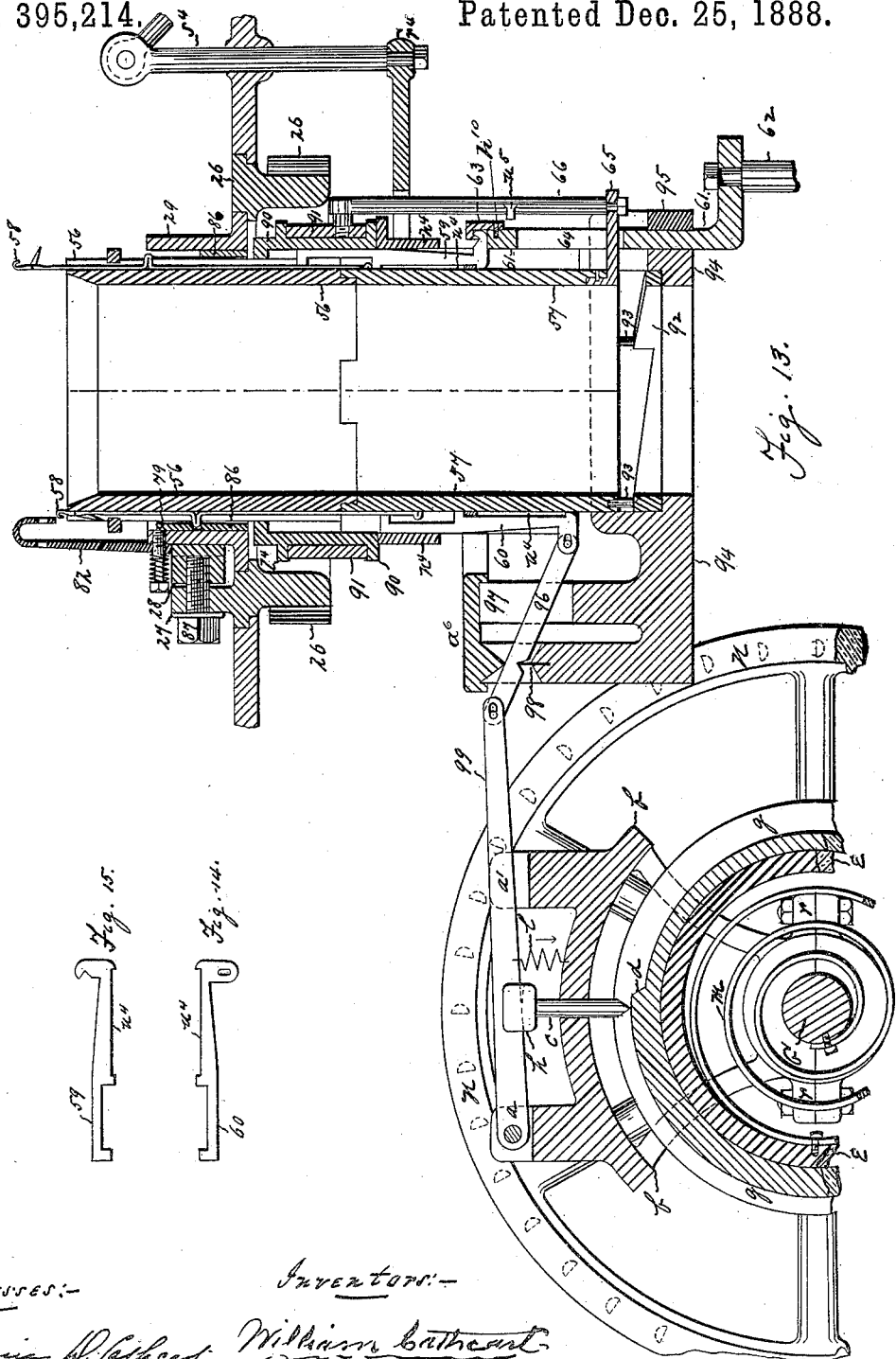

(No Model.) 14 Sheets—Sheet 6.
G. J. & W. L. CATHCART.
W. CATHCART, Administrator of G. J. CATHCART, deceased.
CIRCULAR KNITTING MACHINE.
No. 395,214. Patented Dec. 25, 1888.
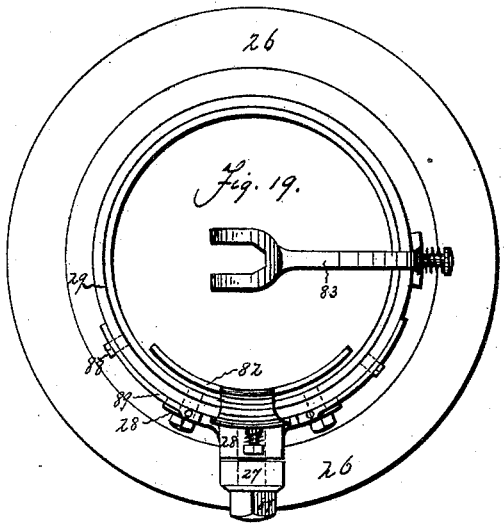
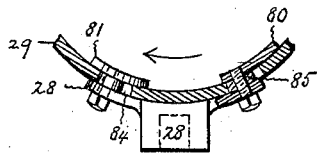
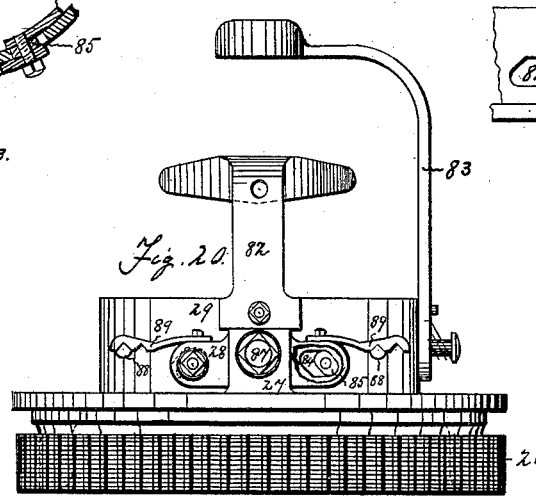
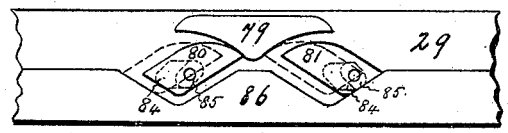

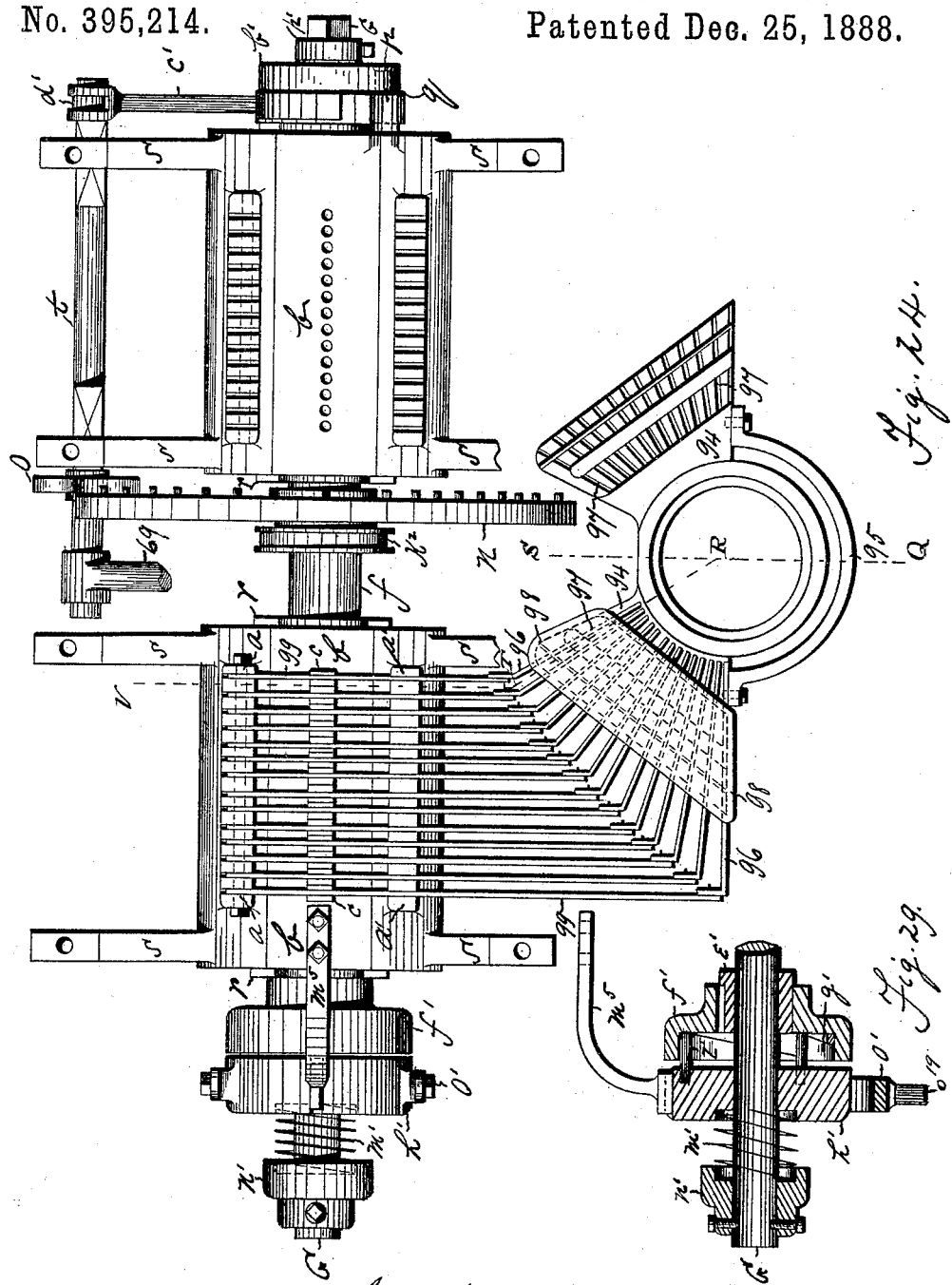

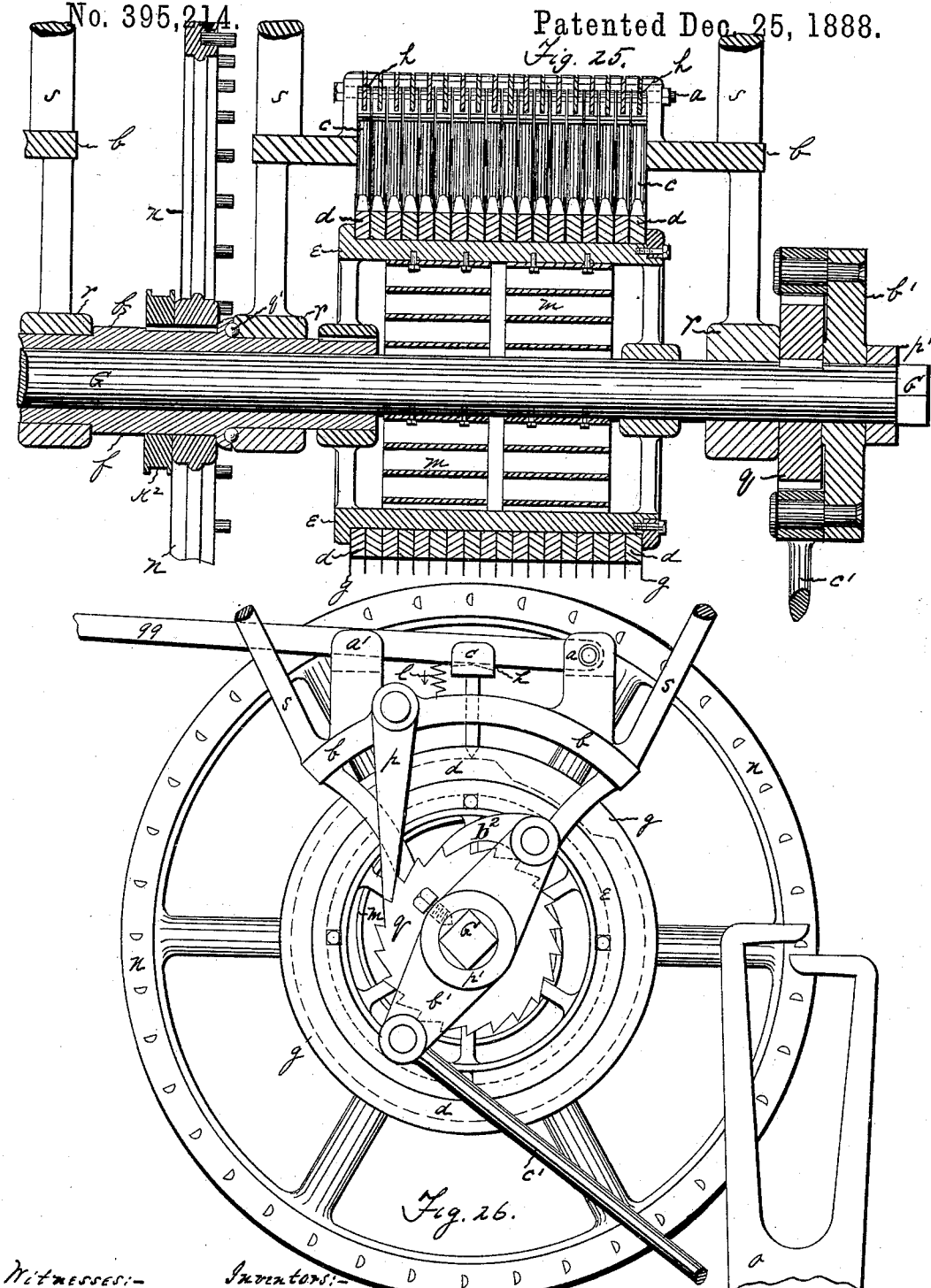

(No Model.) 14 Sheets—Sheet 9.
G. J. & W. L. CATHCART.
W. Cathcart, Administrator of G. J. Cathcart, deceased.
CIRCULAR KNITTING MACHINE.
No. 395,214. Patented Dec. 25, 1888.
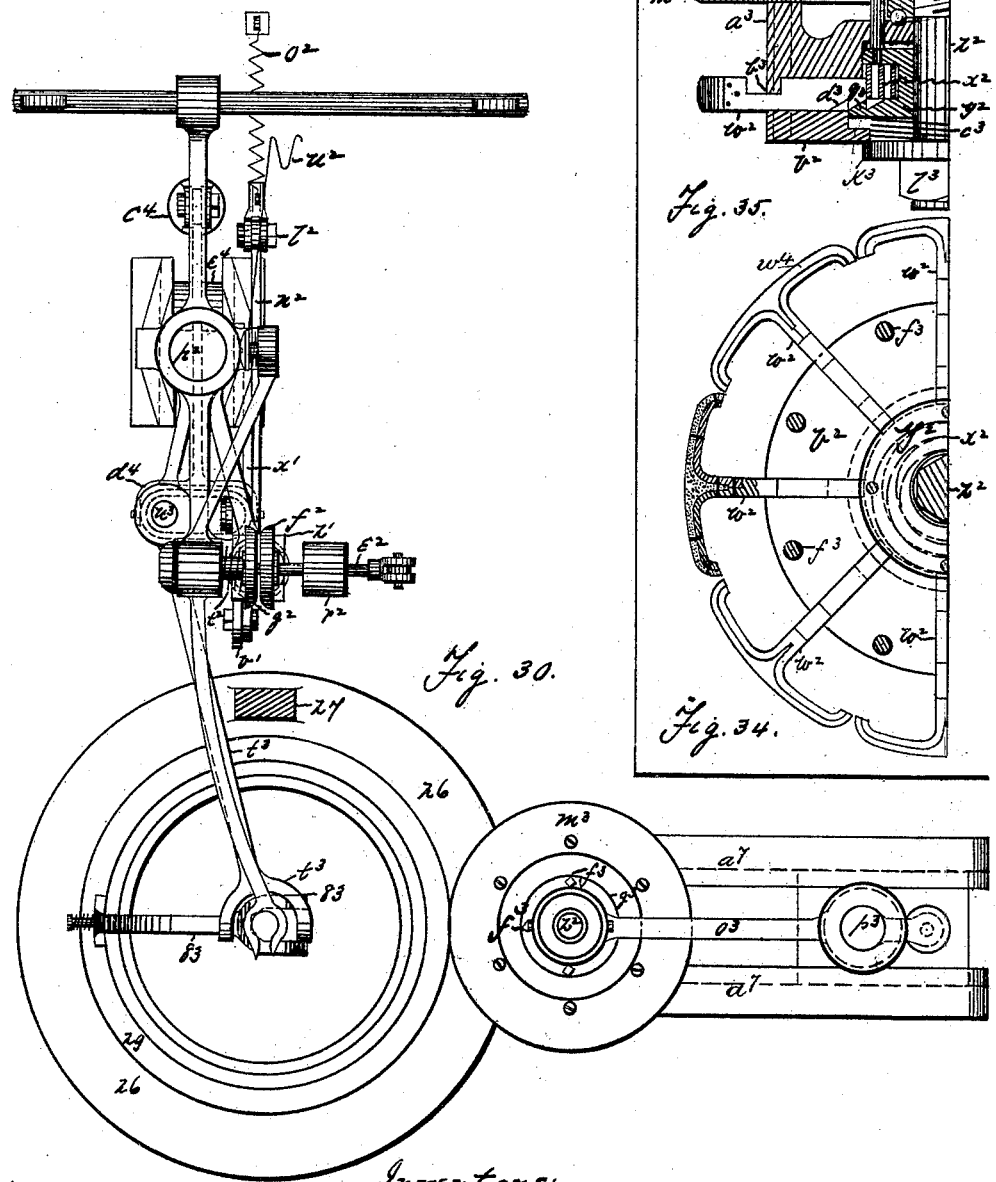

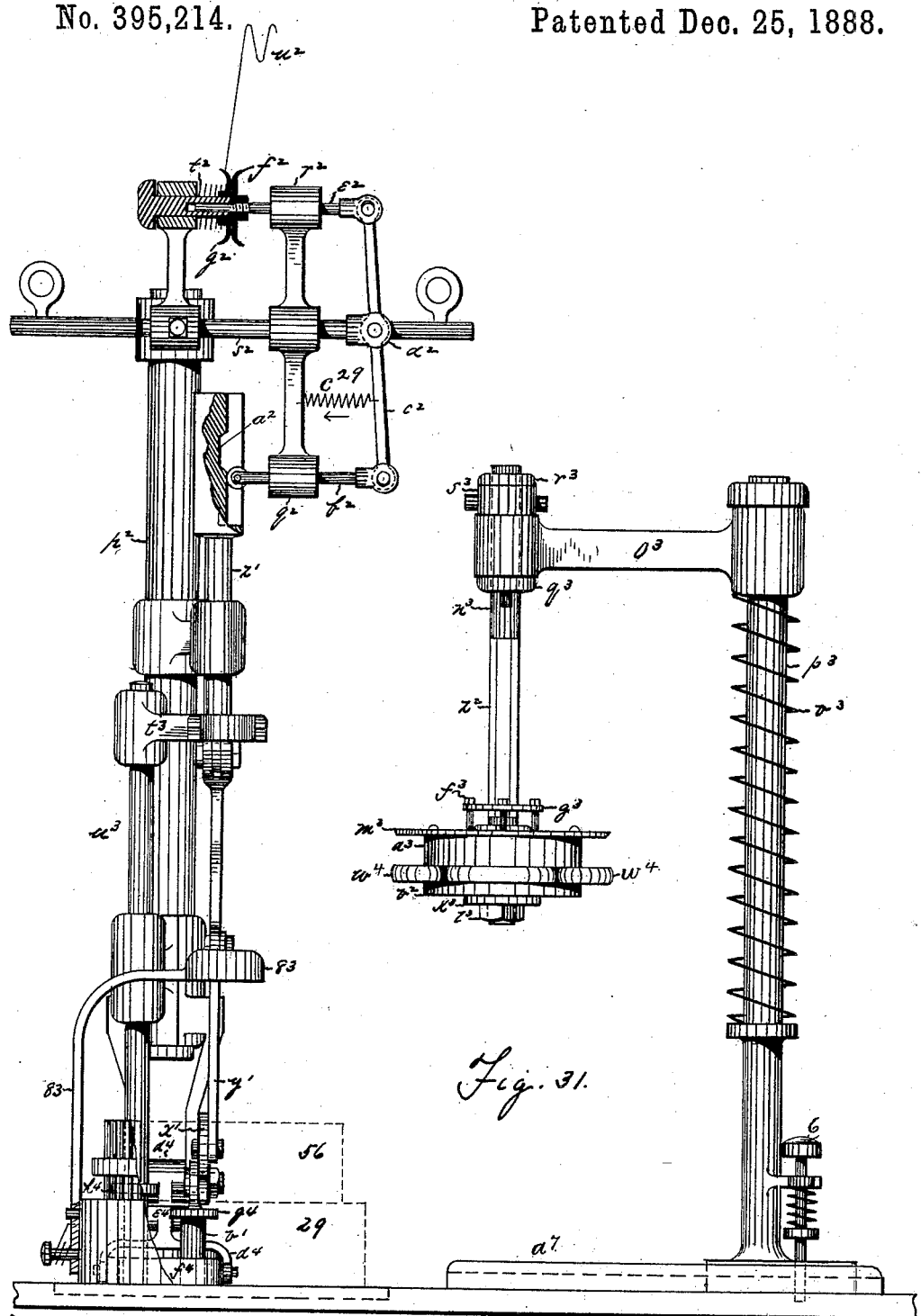

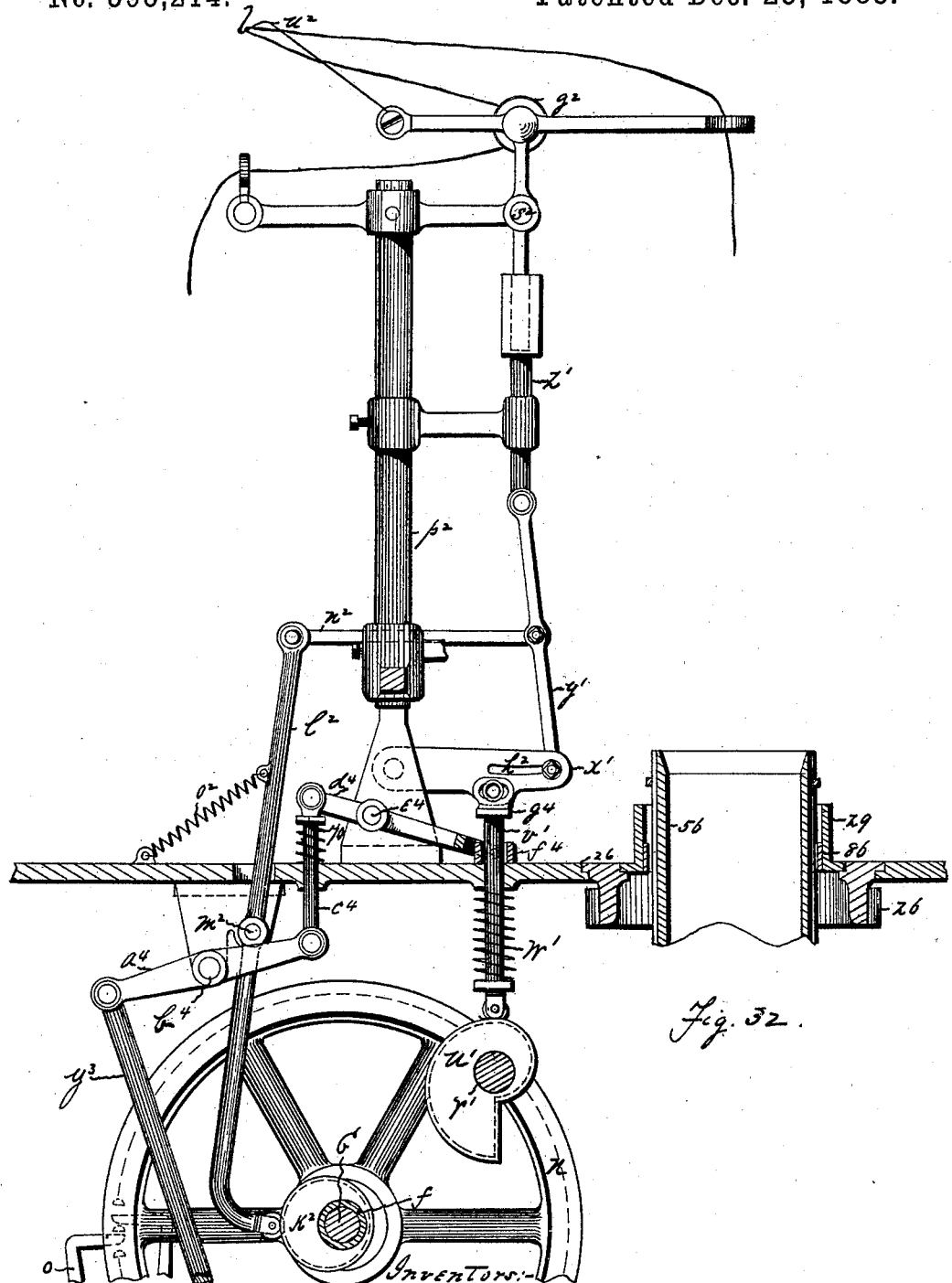

(No Model.) 14 Sheets—Sheet 12.
G. J. & W. L. CATHCART.
W. CATHCART, Administrator of G. J. CATHCART, deceased.
CIRCULAR KNITTING MACHINE.
No. 395,214. Patented Dec. 25, 1888.

(No Model.) 14 Sheets—Sheet 13.
G. J. & W. L. CATHCART.
W. CATHCART, Administrator of G. J. CATHCART, deceased.
CIRCULAR KNITTING MACHINE.
No. 395,214. Patented Dec. 25, 1888.
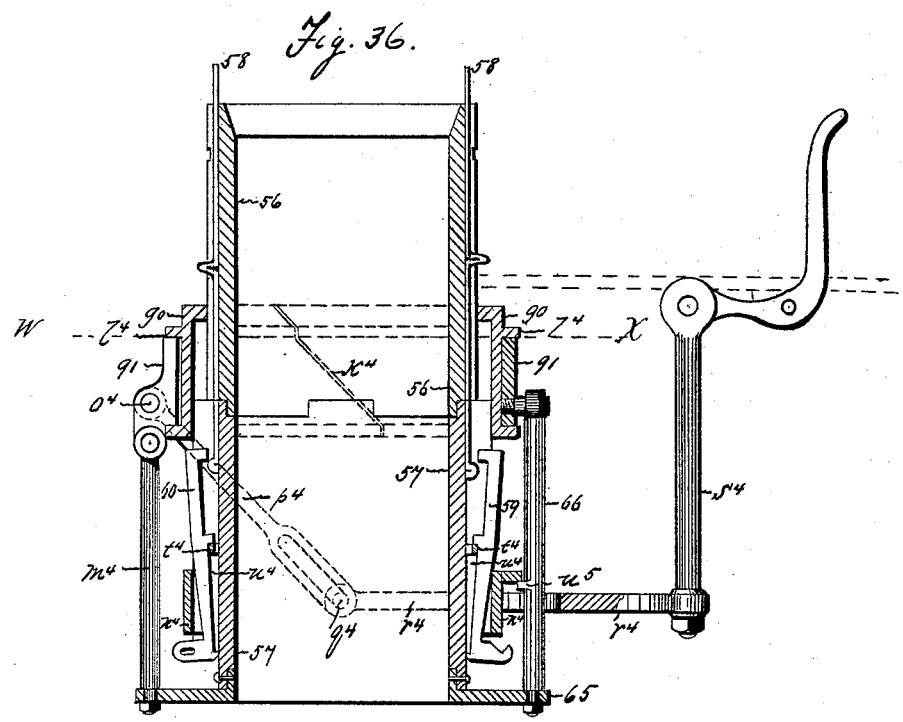
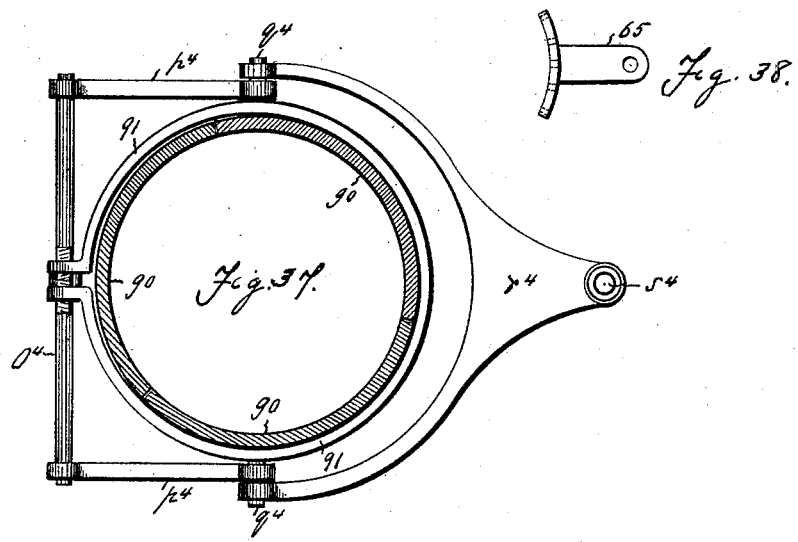

(No Model.) 14 Sheets—Sheet 14.
G. J. & W. L. CATHCART.
W. CATHCART, Administrator of G. J. CATHCART, deceased.
CIRCULAR KNITTING MACHINE.
No. 395,214. Patented Dec. 25, 1888.
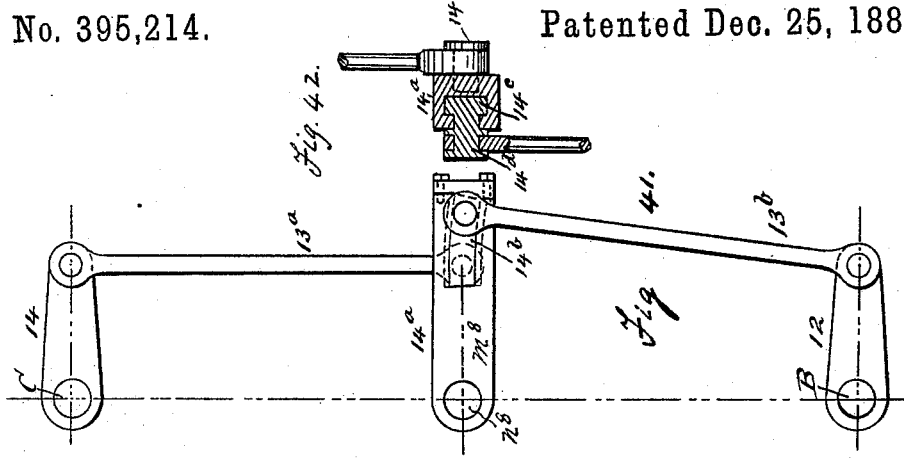
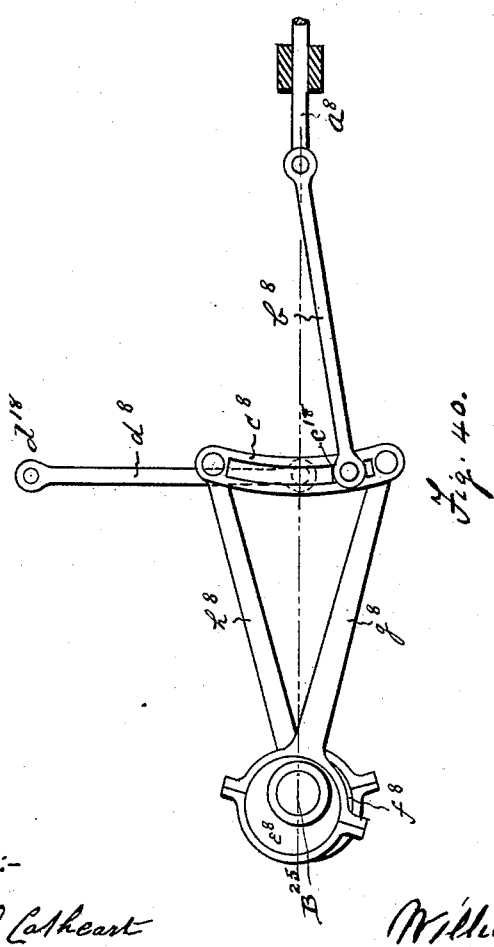
Witnesses:—
Mamie D. Cathcart
Alexander T. Cathcart
Inventors:
William Cathcart
Administrator of estate of
Gilbert J. Cathcart, dec'd,
William L. Cathcart.

UNITED STATES PATENT OFFICE.

WILLIAM CATHCART, OF GWYNEDD, ADMINISTRATOR OF GILBERT J. CATHCART, DECEASED, AND WILLIAM L. CATHCART, OF PHILADELPHIA, PENNSYLVANIA; SAID WILLIAM CATHCART, ADMINISTRATOR, ASSIGNOR TO ALEXANDER T. CATHCART, OF GWYNEDD, PENNSYLVANIA.

CIRCULAR-KNITTING MACHINE.

SPECIFICATION forming part of Letters Patent No. 395,214, dated December 25, 1888.

Application filed February 3, 1888. Serial No. 262,911. (No model.)

*To all whom it may concern:*

Be it known that GILBERT J. CATHCART, deceased, and WILLIAM L. CATHCART, citizens of the United States, residing at Philadelphia, in the county of Philadelphia and State of Pennsylvania, did invent certain new and useful Improvements in Circular-Knitting Machines; and the following is hereby declared to be a full, clear, and exact description of the invention, such as will enable others skilled in the art to which it appertains to make and use the same.

This invention pertains, more especially, to the class of circular-knitting machines used for knitting stockings and similar articles, the object being to provide an automatic machine in which the several operations necessary to the formation of a complete stocking are effected automatically, thus rendering unnecessary the skilled labor required for operating hand-machines for knitting so-called "seamless" hosiery. In this machine, as in others of its type, the needle-cylinder is stationary and the cam-cylinder containing the needle-actuating cam-grooves either revolves continuously around it, as in knitting the leg and a portion of the foot, or is given a rotary reciprocating motion, as in forming the heel and toe. In the former operation a full set of needles is employed; in the latter, only a part of the set—say, one-half, (more or less,) the remainder being thrown out of action for the time being. Thus when a sufficient length of leg has been knitted a part of the needles are thrown out of operation and the continuous rotary motion of the cam-cylinder is changed to rotary reciprocating, the result of which is the formation of a pouch at one side of the tubular web by knitting back and forth, which pouch forms the heel of the completed stocking. In the course of its formation it is first gradually narrowed in knitting one side thereof, and then again gradually widened in knitting the other side. In order to give it the proper shape, one needle is thrown out of action at each movement to either side in the cylinder's reciprocations during the narrowing process, these needles being taken alternately from the two ends of the series. When the middle or narrowest part is reached, the needles which were successively thrown out of operation are again picked up in the reverse order to that in which they were dropped—that is, alternately at opposite ends of the series, beginning with the last one thrown out of action. When the pouch to form the heel has been knitted, the needles which were thrown out of operation at the beginning of its formation are again thrown into action, the motion of the cam-cylinder is changed back to continuous rotary, and tubular knitting is resumed to form the foot of the stocking. When a sufficient length to form the foot has been knitted, another pouch to form the toe is knitted in the manner above described of forming the pouch for the heel, and when this pouch is finished the stocking is finished so far as the operation of this machine is concerned, the toe being closed after removal from the machine, either by hand or by another machine constructed for that purpose. The cam-cylinder is stopped at the end of tubular knitting long enough to allow that portion of the needles not employed in knitting the heel and toe pouches to be raised out of operative position, and again, after the pouches are formed, to allow them to be dropped into operative position.

In ordinary hand knitting-machines the several operations are effected by hand-manipulation, while in this machine they are effected automatically by machinery, whereby not merely the services of a skilled attendant are rendered unnecessary, but a uniformity in the goods produced is attained, which is impracticable with hand-machines.

The leading features of our invention may be summarized as follows: First, means for reducing the speed of the cam-cylinder in knitting the heel and toe and for again returning to normal speed on resuming tubular knitting; second, means for stopping the cam-cylinder in such a position that one-half (more or less) of the needles (the front half in a machine constructed as herein shown and described) may be raised and lowered *en*

*masse* to throw them out of or into action; third, means for raising one-half (more or less) of the needles to throw them out of action for heel and toe knitting and for lowering them into action in order to resume tubular knitting; fourth, means for changing the motion of the cam-cylinder from continuous rotary to rotary reciprocating for heel and toe knitting, and for returning to continuous rotary on the completion of the heel and toe pouches; fifth, means for changing the needle-actuating cam-path of the cam-cylinder at every movement of said cylinder while reciprocating during heel and toe knitting; sixth, means for lifting out of action in the proper order and at the proper times the needles which are to be dropped in order to gradually narrow the heel and toe pouches, and for again lowering them into action in the proper order and at the proper times for gradually widening said pouches after passing the narrowest points; seventh, means for automatically stopping off the supply of yarn at that point in each movement of the cam-cylinder in reciprocating when the thread-guide (which is carried by the cam-cylinder, and has therefore a stroke of constant length) passes the last needle of the series in operation, and for again releasing the thread at that point in each movement when the thread-guide reaches the first needle of the series in operation; eighth, means for automatically holding the web during reciprocating knitting to prevent the pouch portion of said web from rising with the needles when the latter are lifted by the knitting-cams, said means being independent of the web take-up commonly used in tubular knitting; ninth, means for securing the needle-cylinder in place and for guiding the needles in their vertical movements, and for releasing the cylinder and needles when it is necessary to remove either or both.

Other features, which may be regarded as of minor importance, will be pointed out in the claims.

The general operation of the machine may be outlined as follows: When knitting the tubular portions of stockings—that is, the legs and feet—the machine runs at full speed. When the leg is finished, the cam-cylinder stops long enough to permit the needles not required in knitting the heel (one-half, more or less,) to be raised *en masse* to an inoperative position with their actuating-butts above and entirely clear of the knitting-cams. At the same time the yarn stop-off mechanism and a vertically-moving and spring-pressed web-holder are thrown into operation, the former to stop off the supply of yarn when the last operative needle is passed during each course of reciprocating knitting and the latter to hold the web during that portion of a reciprocation while knitting is progressing, and during the remainder of each movement in either direction to be rising to take hold afresh for the next knitted course. At the same time, also, the escapement which controls the variably-operative needles in action during the reciprocating courses is unlocked. The mechanism for reducing the speed is then brought into operation, and the cam-cylinder is started at the decreased speed; but instead of the continuous rotary motion which it had during the formation of the leg it is now given a rotary reciprocating motion, whereby the needles remaining in operation are caused to knit a pouch for the heel. When the pouch is completed, the reduced-speed mechanism is thrown out of operation and the machine resumes its normal speed. The heel-pouch is to be gradually narrowed on one side, and in order to effect this one needle is raised out of operative position at each movement of the cam-cylinder in reciprocating, the needle so thrown out of operation being taken alternately from opposite ends of the series in action. After this side is completed, the other side of the pouch is knitted, gradually widening throughout its length, the needles thrown out in narrowing being again lowered into operative position in the same manner in which they were thrown out, but in reverse order. The reciprocating movements of the cam-cylinder and of the thread-guide, which is attached to and moves with it, must of necessity be at first of sufficient length to knit the widest course of the flap, and as this motion or stroke is in our machine made, for convenience, of a constant length during all reciprocations, it follows that a yarn stop-off must be provided for checking the supply of yarn at that point in each movement when the last operative needle is passed. This stop-off, which is put in operation at the beginning of reciprocating knitting, grasps the thread at the time above specified in each operation, and holds it until the thread-guide in the return movement reaches the first operative needle, when the stop-off releases the thread until the last operative needle in that direction is passed. This grasping and releasing of the thread are repeated during each movement of the cam-cylinder in reciprocating until the pouch is completed. As soon as the heel-pouch is completed the cam-cylinder stops long enough to allow the needles which were thrown out of operation at the completion of the leg to be again lowered into operative position. The yarn stop-off and web-holder are thrown out of action. At the same time the mechanisms for changing the motion of the cam-cylinder back to continuous rotary and for throwing out of operation and for raising and lowering the variably-operative needles are brought into operation. The speed-controlling mechanism then moves from the "stop" to the "high-speed" position, the cam-cylinder is started, and tubular knitting is resumed to form the foot. On the completion of the foot the operations above described for forming the heel-pouch are repeated to form the toe-pouch, and when this is finished the machine stops automatically and the attendant shifts the belt from the fast to the loose pulley, to prevent further motion of the pattern-chains. The stocking complete, except as to the seam across the toe, can then be removed from the machine.

In the accompanying drawings, which illustrate this invention and form a part of this specification, Figure 1 represents a partly-sectional front elevation of the operative mechanism of the machine, all framing, except the table, and all parts above the table, except the needle and cam cylinders, being omitted. Fig. 2, Sheet 2, is a top plan of all parts below the table, the lever-bed, pattern-drum shaft, and their connections being shown in dotted outline instead of solid detail. Fig. 3, Sheet 3, represents a section on line 3 of Fig. 1, showing the friction-cone and its shifter-fork partly in vertical section and partly in left-hand end elevation, the actuating-cam of the friction-cone in vertical section, and the cam-operating lever, pattern-chain, and chain-drum in left-hand end elevation. Fig. 4, Sheet 3, is a top plan of the mechanism shown in Fig. 3 and of parts of the adjusting-gear for stopping the cam-cylinder at the proper time and in the proper position. Fig. 5, Sheet 3, is a left-hand end elevation of a section of Fig. 1 on line M N, showing the adjusting-cam 53 and ratchet 41 and their connections for stopping the cam-cylinder in proper position. Fig. 6, Sheet 3, is a partly-sectional front elevation of the mechanism for moving the tripping-shield 43 of the adjusting-ratchet 41. Fig. 7, Sheet 3, shows the tripping-shield 43 and its lever 44 both in plan and in side elevation. Fig. 8, Sheet 3, shows the adjusting-cam 53 in longitudinal and in transverse section. Fig. 9, Sheet 1, is a partly-sectional left-hand end elevation of the adjusting-cam gear. Fig. 10, Sheet 1, is a front elevation of the adjusting-cam gear. Fig. 11, Sheet 4, is a left-hand end elevation of a section on line O P, Fig. 1, showing the gear for throwing the revolving friction-gear into and out of action and part of the devices for changing the length of the expanding crank or arm of variable radius, 14. Fig. 12, Sheet 2, shows detail views in plan and side elevation of the parts of the expanding-crank 14 on shaft 3, and indicating, also, the connection between said crank and the crank 12 on shaft B, as seen from a left-hand end view. Fig. 13, Sheet 5, is a vertical section on the irregular line V T R Q, Fig. 24, Sheet 7, through the needle and cam cylinders, jack-cylinder, lever-bed, pattern-drum, and their connections, the view being taken from the left-hand end of the machine. Fig. 14, Sheet 5, is a side view of a jack for a variably-operative needle. Fig. 15, Sheet 5, is a side view of a jack for a needle which is out of operation during the formation of the heel and toe flaps. Fig. 16, Sheet 2, shows in semi-plan and in semi-elevation the jack-holder for holding and moving the jacks of the needles which are out of action during the formation of the heel and toe pouches. Fig. 17, Sheet 4, is a right-hand end elevation, partly sectional, of the mechanism for raising and lowering the series of needles which is out of operation during heel and toe knitting, and for throwing into and out of action the yarn stop-off, the web-holder, and the mechanism for controlling the action of the variably-operative needles. Fig. 18, Sheet 4, represents a section through the shaft of the escapement and a portion of the disconnecting-lever 69. Fig. 19, Sheet 6, is a top plan view, and Fig. 20, same sheet, a front elevation, of the cam-cylinder and of the annular gear-wheel which drives it. Fig. 21, Sheet 6, is a development of a portion of the interior of the cam-cylinder, showing the needle-actuating cams and the means for changing the direction of the cam-path. Fig. 22, Sheet 6, is a development of a portion of the exterior of the cam-cylinder, showing the slots in which move the filling-pieces which connect the movable needle cams or switches with the cam or switch yoke. Fig. 23, Sheet 6, is a horizontal section through Fig. 21, showing the cam-yoke and cams partly in plan and partly in section. Fig. 24, Sheet 7, is a top plan view of the lever-bed, pattern-drums, and shaft, and their connections, the levers of the right-hand drum being omitted. Fig. 25, Sheet 8, is a vertical longitudinal section through the right-hand pattern-drum, the escapement-wheel, and the winding mechanism, the supporting-shaft being shown in elevation. Fig. 26, Sheet 8, is a right-hand end elevation of the pattern-drum, the winding mechanism, and the escapement-wheel. Fig. 27, Sheet 1, is an elevation of one of the cam-rings secured upon the pattern-drums for throwing the needles into and out of action. Fig. 28, Sheet 2, is a right-hand end elevation of part of the escapement mechanism, showing the means for maintaining a constant tension of the springs that drive the pattern-drums. Fig. 29, Sheet 7, is a vertical section through the fast and loose hubs on the pattern-drum shaft, by which the adjusting-cam 53 is shifted along shaft C, the shaft being shown in elevation. Fig. 30, Sheet 9, is a top plan view, and Fig. 31, Sheet 10, a front elevation, of that part of the yarn take-up and of the web-holder gear which is located above the table, showing also part of the knitting mechanism. Fig. 32, Sheet 11, is a left-hand end elevation of the yarn take-up mechanism, showing also part of the knitting mechanism. Fig. 33, Sheet 12, is a vertical section through the needle and cam cylinders, the annular driving-gear 26, and the web-holder, and a left-hand end elevation of the mechanism for operating the web-holder. Fig. 34, Sheet 9, is a partly-sectional semi-plan, and Fig. 35, same sheet, a semi-section, of the web-holder, the cap $a^3$ being omitted in Fig. 34. Fig. 36, Sheet 13, is a vertical section through the needle-cylinder and its support, and through the grip and guard bands on the line S Q, Fig. 24, showing the relative positions of the grip and guard bands and jacks to allow the needle-cylinder to be removed. The jacks 60 at the left of the view would not appear in a section on line S Q, since the needles at the rear of the cylinder for about thirty degrees on each side of the section-line are always in operation, and are therefore not provided with jacks. The jack-sinker 60 is shown in the view merely for the purpose of illustrating the positions of the jacks of the variably-operative needles when the parts are in position to permit the needle-cylinder to be removed. Fig. 37, Sheet 13, is a top plan view of the grip-band and a horizontal section through the gripping-pieces on the line W X, Fig. 36. Fig. 38, Sheet 13, is a plan of the base of one of the standards that support the grip-band, and Fig. 39, Sheet 4, is a top plan view of the lever and connections for moving the revolving friction-gear into and out of action and for changing the length of the crank or arm of variable radius 14. Fig. 40 illustrates a link used in steam-engines, and known as the "Gooch link," which in modified form is applicable to this machine. Fig. 41 illustrates an alternative for the expanding-crank, hereinafter described, for changing the motion of the machine from rotary to rotary reciprocating, and vice versa. Fig. 42 represents a section on the line 1 2 of Fig. 41.

The terms "right-hand end view" and "left-hand end view," as used in the foregoing description, signify that the views are taken from the end of the machine indicated, that end on the right hand of the observer as he faces the machine in Fig. 1 being regarded as the right-hand end, and that on his left hand as the left-hand end. In the views from which the frame of the machine is omitted the journals of the several shafts shown are unshaded, and are marked conventionally with cross-lines, the length of which indicates the length of the journal-bearings.

The same parts are marked with the same letters or figures in all the figures of the drawings.

A designates the power-shaft from which the mechanisms for performing the various operations are driven. This shaft is provided with the usual fast and loose pulleys, 2 3, through which power is applied and taken off to run and stop the machine. It also carries the male part 5 of a double-cone friction-clutch, which revolves therewith, but is free to be moved longitudinally in either direction from a central position into engagement with the female parts 6 and 7, which are bolted, respectively, or otherwise attached to the spur-wheels 8 and 9, these being of different diameters and mounted loosely on the same shaft, A, so as to be capable of revolving independently, but not so as to be capable of moving longitudinally upon it. These gears mesh, respectively, with spur-gears 10 and 11, which are also of different diameters and are keyed on the shaft B, which is directly below shaft A.

From the foregoing it will be understood that whichever gear, 8 or 9, is driven by the friction-cone 5 will rotate the shaft B, while the other will rotate idly on shaft A, and that slow motion will be imparted by gear 8 and fast motion by gear 9. The motion of shaft B is communicated through crank 12, connecting-rod 13, and crank 14 to shaft C, which is located vertically above shaft A. As single crank-connections are liable to stop at the dead-points, revolving friction-gear 15 16 17, Fig. 11, Sheet 4, of the ordinary type is employed as an auxiliary to the cranks and to carry the latter past the dead-points. Of this gear the lower male wheel, 15, is keyed to shaft B, the upper male wheel, 16, to shaft C, and the female part 17 revolves on a spindle, 18, which is carried by a bar, 19, that is capable of being reciprocated in a guideway, 20, attached to the frame of the machine. The reciprocation of the bar 19 in one direction to carry the female gear 17 out of action is effected by a pattern or cam chain, K, carried by a drum on shaft F, which is in rear of shaft A, and in the opposite direction to throw the said gear into action by a spring, 74. The wheels 15 and 16 are of the same size, and the spindle 18, when the wheels are in action, is equidistant from the axes of both. Therefore the exact angular velocity of wheel 15 is imparted to wheel 16, and said wheels work in unison with the crank-connection between the two shafts B and C. The purpose of throwing this friction-gear into and out of action is explained by the fact that in circular knitting the shaft C rotates, while in heel and toe knitting (which is effected by reciprocatory motion) it oscillates. It is evident that during the backward oscillations the friction-gear, if in action, would work against the cranks. Moreover, the oscillations of shaft C, being less than a half-revolution, there are no centers to pass and the friction-gear is not needed; hence the provision for throwing it out of gear at this stage of the work.

On the shaft C, to the right of the friction-wheel 16, is a spur-gear, 21, which meshes with a similar gear, 22, keyed on a short shaft, D, above shaft C. For reasons to be hereinafter explained, the gear-wheel 22 is exactly one-half the diameter of gear-wheel 21. At the opposite end of shaft D is a miter-gear, 23, which meshes with and drives the combined spur and miter gear 25, the latter in turn meshing with and driving the annular spur-gear 26, which is connected with and drives the cam-cylinder 29. It will thus be seen that the fast or slow speed required for tubular or for heel and toe knitting is obtained by shifting longitudinally on the shaft A the double friction-cone 5, which, when driving the gear 9, gives the fast speed required for tubular knitting, since gear 9 is much larger in diameter than gear 11, with which it meshes, and when driving-gear 8 gives the relatively slow motion required for heel and toe knitting, since the gears 8 and 10 are of the same diameter. It will also be understood that when the double cone 5 is in the central position where it drives neither of the gears 8 9 the shaft B, and consequently the cam-cylinder also, will be at rest so far as the main driving mechanism is concerned. An auxiliary driving-gear has been added, the purpose of which will be hereinafter explained.

The friction-cone 5 is moved along the shaft A by the shifter-fork 30, (see Figs. 3 and 4, Sheet 3,) which grasps pins set in a loose collar, 31, that encircles the neck of the cone. The upper part or stem of the fork 30 is bent in a vertical plane and projects into an inclined opening, which is denominated a "cam-path," in a built-up block or cam, 32. This block or cam is capable of moving vertically between guides 33, which are attached to the frame of the machine, and when moved up or down will force the fork, and with it the cone, to the right or left, according to the direction of movement. This vertical movement of cam 32 is effected by a substantially built-up pattern or cam chain, E, which is carried by a revolving drum, 35, on shaft F, as follows: One end of a lever, 36, which is pivoted at 37, passes through the cam-block 32, and the other end, which is provided with an anti-friction roller, presses upon the pattern or cam chain E, being held in contact therewith by a spring, 38, the upper end of which is attached to the frame of the machine. The links of the chain E are of three heights corresponding with the fast motion, stop, and slow motion positions of the cone 5. Thus when the roller end of the lever bears upon the lowest links of the chain the cam-block will be in its highest position, the cone 5 will be forced to the right, and the gear 9 will be driven, whereby the fast motion will be produced. When it is tripped by the next higher or intermediate links the cam-block 32 will be drawn down to the middle or "stop" position, neither of the gears 8 9 will be driven, and the shaft B will be at rest. When it is still further tripped by the highest links of the chain, the cam-block will be drawn down to its lowest position, the cone 5 will be forced to the left, and the gear 8 will be driven, whereby the slow motion required for heel and toe knitting will be produced. Thus by placing links of the proper height at the proper points in the chain the shifter-fork and friction-cone will be brought to either of these three positions at the proper times to produce a stocking of any desired length. The chain-shaft F is driven by power-shaft A, which is always in motion through eccentric 39, strap $39^a$, and ratchet and pawl 40.

The automatic stoppage of the cam-cylinder in such a position that the front half of the needles may be raised *en masse* out of action— *i. e.*, with the needle-actuating cams 79, 80, and 81, Fig. 21 of Sheet 6, in the center of the rear half of the needles—involves the employment of two distinct mechanisms: first, in order to remove the question of momentum from the problem, the friction-cone 5 is brought to the central position, in the manner above explained, when the machine stops. A ratchet, 41, on the shaft B, and actuating-eccentric, 42, on shaft A, (see Fig. 5, Sheet 3,) a strap or connecting-rod, $42^a$, and pawl $41^a$ are then thrown into action, and these drive the machine at a very low rate of speed until the cam-cylinder is brought to the proper position; second, when the proper position is reached a tripping mechanism is brought into action, by which the pawl $41^a$ is thrown out of engagement with ratchet 41, thus leaving the machine without power, and consequently at rest, until the pattern or cam chain E acts through the lever 36, cam-block 32, and shifter-fork 30 to move the cone 5 into action, when the machine again starts. The mechanisms referred to are shown in Figs. 3 to 10, inclusive.

The ratchet 41 is keyed on shaft B, and its pawl is actuated by the eccentric 42, which is keyed on shaft A, and whose strap and rod move the loose crank which carries the pawl. Inasmuch as the shaft A is always in motion, the ratchet 41 would be always acted upon by its pawl without some provision for throwing the pawl out of action. To effect this throwing out of the pawl, a shield, 43, is fixed to the lower end of a lever, 44, which is loosely fulcrumed on shaft B, and whose upper end is connected to a vertically - movable rod, 45, which is suitably supported in stationary guides and is pressed upward by a spring, 46. The rod 45 is connected with one end of a lever, 47, which is pivoted at 48, and whose opposite end, which carries an anti-friction roller, rests on a cam-table, 49, connected with one of the arms of the shifter-fork 30 and movable horizontally with said fork. The table 49 has a depression at its center; but the two ends are of the same vertical height. At either the fast or slow positions of the fork 30 the roller end of the lever 47 will rest upon the high-portion (one of the ends) of the table 49, the rod 45 will be pressed down, the lever 44 will be turned, and the shield 43 thrown under the pawl to force and hold the latter out of engagement with the ratchet; but when the fork is in its central position and the friction-cone 5 is out of action (in the "stop" position) the end of the lever 47 will rest in the depression of the table 49, the rod 45 will be pressed up by its spring 46, and the shield 43 will be withdrawn from under the pawl, leaving the latter free to engage with and act upon the ratchet.

In order to stop the machine at the exact point required, there is placed vertically above the lifting-rod 45 a tripping-rod, 50, movable in stationary vertical guides, which has a curved roller-arm, 51, the outer end of which bears constantly on a rotating cam, 53, which is mounted on and revolves with the shaft C, and is capable of longitudinal movement thereon. This cam (see Fig. 8) has, at a point in its circumference corresponding with the position in which the cam-cylinder is to be stopped, a depression, 54, into which the roller - arm drops when it (the depression)

reaches the proper position, the rod and arm being pressed down by a spring, 52, which causes a head on the lower end of rod 50 to strike the rod 45 and force it down, whereby the shield 43 is again interposed between the pawl and ratchet, and the cam-cylinder is stopped at the exact point. The cam 53 is of such a length that when moved to the right its depression 54 will be carried out of its plane of the roller-arm 51, and the latter will then rest on the cylindrical part of the cam, and will be prevented from dropping down. It is only when the cam is moved to the left, as represented in Fig. 1, that the rod 50 can drop to move the shield 43.

The longitudinal movement of cam 53 on shaft C is governed by a shifter-fork, 55, Figs. 9 and 10, Sheet 1, pivoted at 57, and operated by a sliding hub, $h'$, on shaft G, the action of which will be hereinafter described in detail.

During tubular knitting cam 53 is always in the position indicated in Fig. 1, and hence at the end of tubular knitting, when ratchet 41 is thrown into action its pawl will be tripped during the first revolution of shaft C. During heel and toe knitting cam 53 moves to the left three times, as will be hereinafter explained. The first two of these movements have no effect upon the machine, as it is then driven by the friction-cone 5; but the last occurs exactly at the end of the last required reciprocation of the cam-cylinder, at which time, through the proper arrangement of the links on chain E, the machine is being driven by the pawl $41^a$ and ratchet 41, so that the shield will be raised and the pawl tripped within one oscillation of shaft C, thus stopping the cam-cylinder at the proper position for lowering the series of needles previously raised en masse.

The automatic raising and lowering at the proper times of one half of the needles to throw them out of or into action is effected primarily through the agency of a pattern or cam chain, H, carried by a drum on shaft F. As shown in Fig. 13, Sheet 5, the needle-cylinder 56 rests on a lower cylinder, 57, of greater external diameter, but with corresponding grooves, in which move, when required, the jacks 59 60, which bring the needles into and out of action. The needles 58 are each formed with two butts, the upper one fitting into the needle-actuating cam-groove of the cam-cylinder, and the lower one forming a projection by which the jack can grasp the needle to pull it into or push it out of action. For convenience, the needles are made of the same shape throughout the cylinder, although one-third (more or less) of the back needles, which are always in operation, require no lower butts. The jacks 59 and 60 are used with all the needles, except those just specified, which knit the narrowest part of the web in forming the heel and toe pouches. They are of different shapes, as shown in Figs. 14 and 15, those marked 59 being used with the front needles, which are inactive during heel and toe knitting, while those marked 60 are used with the two-thirds of the back needles, which are variably operative during that time. The function of the jacks is twofold: First, to raise the needle out of action by lifting their upper butts above the highest point of the needle-actuating cams, in which case the lower butts of the needles rest on the bottoms of the upper interior spaces of the jacks, and, secondly, to pull the needle down into action again, or sufficiently low for the actuating cam-groove to catch and operate the upper butts. The upper interior space on the jack is at least equal to the vertical stroke of the needle in knitting plus the height of lower butts.

The jack-frames of the front needles, which are raised and lowered in a body, are secured in a jack-holder, 61. (Shown in section in Fig. 13, Sheet 5, and in semi-front elevation and in semi-plan in Fig. 16, Sheet 2.) This jack-holder is simply an annular semi-cylinder with a flange at the bottom, to which the lifting-rod 62 is attached, and formed at the top with radial notches or grooves to receive the jacks. The jacks are held in place by an annular cap, 63, which has an inner down-turned knife-edge flange which rests in notches formed in the upper sides of the out-turned bases of the jacks and holds the latter down to the jack-holder. This cap is secured to the jack-holder by screws $h^{10}$.

In the center of the jack-holder there is a vertical slot, 64, through which projects an arm, 65, at the bottom of cylinder 57, which arm supports the standard 66, the said slot being of sufficient length to permit the vertical movement of the jack-holder necessary to move the needles into and out of action. The jack-holder, and with it the front jacks and needles, is raised and lowered by the lifting-rod 62, which in turn is operated by a lever, 67, pivoted at 68. (See Fig. 17, Sheet 4.) Lever 67 is joined to and operated by the roller-lever 69, which is moved by pattern or cam chain H, carried by a drum, $H^{90}$, on shaft F, said lever being held against said chain by a spring, 70, through intermediate connections, hereinafter described, as shown in Fig. 17. Inasmuch as chain H acts in the same manner and at the same time as pattern-chain E, it is evident that when the machine has been stopped at the proper place, as above described, a low link in chain H, coming under lever 69, will allow said lever to fall at that end, raising the outer end of lever 67, lifting-rod 62, jack-holder 61, and front jacks and needles. The stroke of jack-holder 61 is so graduated as when it is raised to throw the upper butts of the needles entirely clear of the needle-actuating cams. The lever 67 is curved or bent at that point below the jack-holder to allow the knitted web to pass to the web take-up.

The reciprocating rotary motion of the cam-cylinder, by which heel and toe knitting is effected, is obtained by throwing the central friction-wheel, 17, out of gear and by increasing the length of crank 14—that is, the distance from the center of the shaft to the center of the crank-pin—on the upper crank-shaft, C. This is automatically effected by the pattern or cam chain K, which is carried by the drum $K^{90}$ on shaft F, and which is consequently moved in the same way and at the same time as chains E and H. While friction-wheel 17 is in gear with wheels 15 and 16 and cranks 12 and 14 are of equal length, the shaft C will revolve at the same speed as shaft B; but if the friction-gear be thrown out of operation and crank 14 be lengthened without changing the length of crank 12 it is apparent that while shaft B will still revolve the shaft C will oscillate through a portion of a revolution, the degree of oscillation depending upon the relative lengths of the two cranks. Inasmuch as it is necessary to make each movement of the cam-cylinder while reciprocating extend through as nearly a full revolution as possible, in order to gain time for raising or lowering a needle in the interval between finishing one course and commencing another, the semi-rotation of shaft C is doubled in shaft D by making spur-gear 22 one-half the diameter of spur-gear 21. Shaft D will then be oscillated at nearly a full revolution, and as the miter-gear 23 and the annular gear 26, which latter reciprocates the cam-cylinder, are of the same diameter it follows that the cam-cylinder in each of its movements will be carried through nearly a full revolution.

The construction of the arm of variable radius or expanding-crank 14, by the operation of which the rotary motion of the cam-cylinder is changed to rotary reciprocating, is as follows: The crank, (see Fig. 12, Sheet 2,) is a flat plate, 142, which is keyed to shaft C, and has in it a slot which is described from the center of the crank-pin of crank 12 when both cranks are in a horizontal position and standing in the same direction, as shown in Fig. 12, which is the position of the cranks when the machine is stopped for lengthening or shortening the expanding-crank, raising or lowering the front needles, &c. It is important that the slot be thus described, for if not the movement of the crank-pin of crank 14 in or out to shorten or lengthen the crank would either draw the two cranks 12 14 toward each other or force them apart, and would thus change the relative positions of the mechanisms carried or operated by the two shafts B C.

It is obvious that the cranks can be stopped in any position excepting the vertical or nearly vertical, and the expanding-crank be lengthened or shortened without affecting the relative positions of the mechanisms carried or operated by the shafts B C, provided always that the slot in the expanding-crank be described from the center of the lower crank-pin when the cranks are in the given position, and the invention is not limited to the position chosen, which is simply that which brings the slot as nearly as possible in horizontal line with the axis of a crank of the ordinary form. The principle involved is that of the "Gooch link," (illustrated in Fig. 40 of the drawings,) in which $c^8$ designates a link which is coupled at its center to a swinging connecting-rod, $d^8$, by which it is connected to a fixed point, $d^{18}$. $b^8$ designates a connecting-rod one end of which is coupled to a movable block, $c^{18}$, in the slot of the link, and the other to a rod, $a^8$, which in the ordinary use of the gear represents the valve-stem. $g^8\ h^8$ are eccentric-rods, by which the two ends of the link are connected with the eccentrics $e^8\ f^8$ on a rotating shaft, $B^{25}$. The point at which the suspension-rod $d^8$ is connected to the link is known as the "dead-point," and as the block $c^{18}$ is moved from or toward this point the reciprocations of the rod $a^8$ are lengthened or shortened. The peculiarity of the gear is that the link has a curvature the radius of which is equal to the length of the connecting-rod $b^8$, the curvature facing the valve-stem $a^8$, whereby a constant "lead" for all grades of expansion is obtained—i. e., the block $c^{18}$ can be shifted in the link without changing the position of the valve, and this principle is involved in the expansible crank 14, since the curvature of the slot permits the crank-pin to be moved toward or from the shaft C without disturbing the relations of the two cranks or changing the position of any of the operative parts of the machine.

An ordinary link-motion with the lower half of the link cut away would answer the same purpose, but would be more cumbrous.

Instead of using an expanding-crank on the shaft C, we may use the alternative device illustrated in Fig. 41, Sheet 14. In this case the two cranks 12 14 on the shafts B C will be of fixed and equal length, and an expanding-arm, $14^a$, will be located between the two and coupled to both by links or connecting-rods $13^a$ and $13^b$. The arm $14^a$ is slotted at $14^b$, the slot being described from the crank-pin of the crank 12, and in the said slot is a sliding block, $14^c$, which carries a crank-pin, $14^d$, to which the upper end of link $13^b$ is coupled. The lower end of link $13^a$ is coupled to a crank-pin, $14^e$, on the opposite side of arm $14^a$, which pin is fixed at a point from the pivot of said arm corresponding with the length of crank 14. When the pin $14^e$ stands at a point which will give that side of the arm $14^a$ an equal radius with the other side and with the two cranks 12 14, all these parts will rotate in unison; but if the crank-pin $14^d$ be moved outward or away from the pivot $n^8$ of arm $14^a$ the latter will be lengthened and the rotary motion of shaft B will be converted into rotary reciprocating in the shaft C and connected parts, as before explained.

Adjacent to the crank 14, on the right, is a secondary crank corresponding in size and shape with crank 14, and provided with a hub, 71, which is feathered on shaft C, and is capable of sliding thereon. This secondary crank has on its outer face two lugs, 72 72, which fit into the slot in crank 14. These lugs have a space between them, and their inner faces are outwardly inclined, and are parallel to each other. They receive between them a block, 73, which carries the crank-pin, and whose sides are inclined to correspond with the inclined faces of the lugs 72 72. These parts are so adjusted that when the two cranks lie close together and the ends of the lugs 72 72 are flush with the outer face of the arm 142 the two cranks 12 14 will be of exactly the same effective length—that is, their crank-pins will be equally distant from the centers of their respective shafts—and rotary motion of shaft C will be possible; but when hub 71 is moved to the right the lugs 72 will be partially withdrawn from the slot in crank-arm 142, the block 73 will be forced outward from the center of shaft C, and the crank will be correspondingly lengthened. The parts will now be in the position for heel and toe knitting.

When tubular knitting is to be resumed, the hub 71 and its crank-arm 143 are forced to the left against crank-arm 142, whereby the block 73 and the crank-pin are forced toward the shaft, shortening the crank and again permitting rotary movement of the shaft. To effect the reciprocation of the cam-cylinder, we have then to lengthen crank 14 (in the manner above described) and also to throw the friction-gears 15 16 17 out of action. These objects are effected through the operation of pattern-chain K, which moves forward the bar 19, that carries the journal 18 of wheel 17, Figs. 11 and 39, Sheet 4, and moves the latter out of engagement with the wheels 15 16. At the same time, through a link, 75, one end of which is connected with the bar 19 and the other end with a crank, 76, on the lower end of a short vertical shaft, 77, the latter is turned in its bearings. The upper end of shaft 77 carries an arm, 78, which terminates in a shifter-fork that is connected with the hub 71, and by the turning of its shaft moves the said hub in or out on the shaft C, whereby, as before explained, the crank 14 is shortened or lengthened and rotary or reciprocating motion of the cam-cylinder is effected according to the direction of movement. Thus when the bar 19 is pressed back to throw the friction-gear out of operation, the hub 71 is moved to the right and the crank 14 is lengthened, and vice versa.

The means for automatically reversing the needle-actuating cam-path are illustrated in Figs. 19 to 23, inclusive, Sheet 6. The cam-cylinder 29 is a plain cylinder with a flanged base, which rests in a recess on the upper surface of the annular spur-gear 26, and is connected to said spur-gear by means of a lug, 27, on the latter, which is connected by a screw, 87, to a yoke, 28, carried by the cam-cylinder. The yoke 28 is connected to the cam-cylinder by screws which pass through openings 84 84 in said cylinder and carry on their inner ends the switch-cams 80 81, which act in conjunction with the double cams 79 86 to change the cam-path at each reciprocation of the cylinder. Cams 79 and 86 are fixed to the interior of the cam-cylinder in the position shown in Fig. 21, and cam 86 is of the same height throughout except where the depressions occur, in which switch-cams 80 81 oscillate. The openings 84 are somewhat elongated in a horizontal direction, and are fitted with filling-blocks 85, through which the screws pass, the said openings and filling-blocks being so proportioned relatively to each other as to permit a sliding movement of the yoke 28 on the exterior and of the connected switch-cams 80 81 on the interior of the cam-cylinder sufficient to close the upper and open the lower cam-path at one side of the double cams 79 and 86, and to open the upper and close the lower paths at the other side, the switch-cams being so arranged and adjusted with relation to the said double cams that when one is moved up to cam 79 and away from cam 86 to close the upper cam-path and open the lower on one side the other will be far enough removed from cam 79 and near enough to cam 86 to open the upper passage and close the lower on the opposite side. Thus the cam-cylinder has an independent motion, and is capable of moving beyond the limits of reciprocation of the annular gear 26 in either direction far enough to open and close the cam-path alternately at opposite sides of the double cams 79 and 86. The machine being in operation, the cams in the relative position indicated by full lines in Fig. 21, and the cam-cylinder moving in the direction indicated by the arrow, the needle-butts will ride up on the right side of cam 81, and will enter the camway between cams 79 81, passing between said cams, then between 79 86, and then between 80 86, leaving the camway at the left of cam 80. At the end of the movement of the gear 26 in this direction the cam-cylinder will be carried forward by its momentum to the limit of its independent movement, as above explained, when the cams will be in the position indicated in broken lines. Then during the return movement the needle-butts will enter the camway between cams 79 80, passing between said cams, then between 79 86, and then between 81 86, passing out at the right of 81.

It is to be observed that at the end of each movement of the cam-cylinder, when the switch-cams 80 81 are shifted to change the direction of the cam-path, the cams are always under that half of the needles which are out of action.

As a precaution against the cylinder jarring out of its proper position, spring-latches 89 89 are attached to the cam-yoke 28, and are notched to engage angular pins or studs 88 88 on the cam-cylinder, each spring being provided with two notches which correspond with the two positions of the cam-cylinder in changing the cam-path, so as to hold the cylinder in either position. The angles of the pins and notches are such as to permit the cam-cylinder to shift its position at the end of each movement, and yet to give the springs sufficient locking-power to hold the cylinder against accidental displacement.

In order to preserve the proper relation of the thread-guide 82 to the switch-cams 80 81 when the cylinder is shifted at the end of each movement to change the cam-path, the thread-guide, which is of the usual style, is attached to the cylinder and partakes of its movements. The cam-cylinder also carries a standard, 83, the upper end of which is forked to embrace the stem of the web-holder, for a purpose which will be hereinafter explained.

The automatic raising or lowering of a needle at the end of each movement of the cam-cylinder, which is necessary in heel and toe knitting, is effected by the system of cams and levers shown in transverse section in Fig. 13, Sheet 5, in longitudinal section in Fig. 25, Sheet 8, in top plan view in Fig. 24, Sheet 7, and in right-hand end elevation in Fig. 26, Sheet 8. The general shape of the cams used is shown in Fig. 27, Sheet 1. As shown in Fig. 13, the needle-cylinder 56 is mounted on the jack-cylinder 57, to which, during the operation of the machine, it is firmly secured by the three segmental and exteriorly-flanged grip-pieces 90, which during knitting are forced by the spring grip-band 91 to firmly grasp both cylinders. (The construction and operation of the spring grip-band and grip-pieces will be hereinafter more fully explained.)

The jack-cylinder has in its circumferential base three pins, 93, which rest on an elevating-ring, 92, of the ordinary inclined plane type, the latter being used for the purpose of increasing or diminishing the length of stitch. The raising device is set in a recess in the horizontal lever-bed 94, which has at its front an annular semi-cylindrical form, and at the rear expands into two wings sufficiently large to furnish fulcra and guide-grooves for the levers of all the back needles which require to be separately raised and lowered during heel and toe knitting. The jack-holder 61 for the front needles is secured in place and guided in its vertical movements by the annular semi-cylindrical cap 95, which is bolted to the front of the lever-bed.

The needles to be separately raised and lowered during heel and toe knitting comprise about one-third (more or less) of the whole number, this proportion being made up of the two one-sixths of the back needles nearest to the ends of the front needles, which are raised en masse out of action at the end of tubular knitting. The central one-third (more or less) of the back needles being always in operation, both in tubular and in heel and toe knitting, are never raised out of action, but are at all times in position to be operated by the needle-actuating cams.

Each of the needles of the variously-operative one-third above referred to is provided with a jack, 60, said jacks being each connected by pin-and-slot connection with a lever, 96, fulcrumed on a knife-edge bearing, 98, set in the lever-bed and guided in a groove, 97, said levers being held to their bearings by a cap, $a^6$, bolted to the top of bed 94, and having a knife-edge flange, which stands over the bearing 98. To each lever 96 is connected a supplementary lever, 99, pivoted at $a$ and guided at $a'$ in the pattern-drum cover $b$. These levers are raised by vertical pins $c$, which have saddle-heads $h$, in which the levers lie, the pins being raised by annular cams $d$ on the pattern-drums $e$ and drawn down, when permitted, by the said cams, by springs $l$, and the levers 96 and 99 are so connected as to permit lever 96 in rising to move sidewise on the connecting-pin.

The variably-operative needles being arranged at the right and left of the central needles, which are always in operation, the levers by which they are raised and lowered are correspondingly arranged in two series on the two wings of the lever-bed, and a pattern-drum is provided for each series, said drums being mounted on a horizontal shaft, G, and connected by a sleeve, $f$, so that they will rotate together as one drum on said shaft G. These drums are provided with circumferential cams $d$, (one for each lever,) which, for convenience, are made in the shape of rings, as represented in Fig. 27, Sheet 1, and are keyed upon the drums. As represented, the cams have each one high and one low part on their outer peripheries, whereby one elevation and one depression of the needle operated by each is effected during one revolution of the cylinders, from which it is to be understood that the machine, as here illustrated, is geared and arranged to knit a heel-pouch during one full revolution and a toe-pouch during another full revolution the heel and toe pouches being made exactly alike. We desire to state, however, that this part of our invention is not limited to any particular shape of the cams, nor to their arrangement upon the pattern-drums, as the latter may be geared to make but a partial revolution during the knitting of the heel-pouch and to complete the revolution during the knitting of the toe-pouch, in which case the heel and toe pouches may be made of different shapes. This part of our invention is also applicable to other purposes than stocking-knitting, and may be used in machines for knitting only flat webs. The cams may be so disposed on the cylinders as to produce webs of any desired shape.

Under the arrangement of levers, as hereinbefore described, and as illustrated in Figs. 13 and 24, the needles are held in operative position by the high portions of the cams $d$, and are raised out of operation when the pins $c$ drop from the high to the low parts, the levers 99 being drawn down by their springs $l$.

In the adaptation of this part of our invention to stocking-knitting, as herein described and shown, the cams $d$ are so proportioned with respect to their high and low surfaces, and are so arranged upon their drums $e$ that when that point is reached in the formation of the heel or toe where it is desired to begin narrowing, whether at the end of the first or any subsequent course, the outer cam upon one of the drums $e$ allows its lever 99 to drop and throw its needle out of action. At the end of the next movement of the cam-cylinder the cam at the outer end of the other drum throws its lever and needle out of action, and so on, the cams acting successively and alternately from the outer ends of the drums $e$ toward their inner ends till the variably-operative needles are all out of action and the narrowest point in the web is reached. After the narrowest point is passed, the needles are again brought into action in the reverse order from that in which they were thrown out. Inasmuch, therefore, as the widening operation begins as soon as the narrowest point is passed, it follows that the low part of the inner cam, $d$, must be quite short, barely sufficient to allow the inner needle (the one last thrown out) to remain out of action while the cam-cylinder makes one movement, and that the outer cam, which first acts, must have a depression of sufficient length to allow its needle to remain out of action while all the other variable needles are thrown out of and brought back into action.

Two conditions govern the raising and lowering of the variably-operative needles: first, these movements must occur almost instantaneously, and to effect this the inclines which connect the high and low parts of the cams $d$ must be as abrupt as is consistent with their operation; second, they must occur at or near the end of a movement of the cam-cylinder when the needle-actuating cams 79 80 81 are beneath the series of needles previously raised out of action and when they, therefore, cannot prevent the upward or downward movements of the variably-operative needles.

The cams $d$ are separated by thin diaphragms $g$, which are higher than the cams and serve as guards to keep the pins $c$ on their respective cams. The pins are also held and guided by the vertically-guided levers which rest in the slots $h$ in their saddle-heads. The drums $e$ are rotated by spiral band-springs $m$ $m$—two to each drum—which are wound upon the shaft G within the drums, and their rotation is regulated and controlled by an escapement-wheel, $n$, and its fork $o$, Fig. 17, Sheet 4, and Fig. 28, Sheet 2, the former being keyed upon the sleeve $f$. The springs are prevented from turning the shaft G backward by a detent, $p$, Fig. 26, Sheet 8, which is pivoted to the cover $b$ of one of the drums and engages a ratchet-wheel, $q$, on the end of the shaft. Both the shaft G and sleeve $f$ have bearings in depending brackets $r$, which are cast solid with the covers $b$ of the drums, and the said covers are suspended from the under side of the table by braces or arms $s$ $s$.

In order to raise or lower the needles at or near the ends of the movements of the cam-cylinder only, the rotation of the pattern-drums $e$ is governed, as before stated, by an escapement-wheel, $n$, and an escapement-fork, $o$, these being so arranged as to permit the successive step-by-step movements of the drums only at the times when the cam-cylinder is at the ends of its movements.

The escapement-fork $o$ is constructed, as represented in Figs. 17 and 28, with two unequal arms, the ends of which turn inward and project slightly past each other. It is carried by a shaft, $t$, which oscillates in bearings in the frame of the machine and engages laterally-projecting pins on the escapement-wheel $n$. It is vibrated by an eccentric, $u$, on shaft B and by a spring, $v$, acting through a horizontal reciprocating rod, $w$, moving in guides attached to the frame of the machine, the lever $x$ pivoted at $y$, and the connecting-rod $z$. The pins of the escapement-wheel are first caught by the shorter arm of the fork $o$, passing thence to the longer arm, when the fork is vibrated, and escape through the opening between the inturned ends.

The pins of the escapement-wheel correspond in number with the number of complete reciprocations which the cam-cylinder is required to make in knitting a heel or toe pouch, the distance between the under sides of the two inturned ends of the fork-arms being half the distance between the two pins; hence it follows that the number of vibrations of the fork and the number of forward impulses of the drums $e$ in making a complete revolution correspond with the number of movements in opposite directions of the cam-cylinder in knitting a heel or toe pouch, inasmuch as the pins of the escapement-wheel escape from the fork $o$ at or near the center of vibration of the latter, and as the cams $d$ act to throw the needles out at each impulse of the drums $e$ the eccentric $u$ must of course be so adjusted on its shaft with relation to the movements of the cam-cylinder as to bring fork $o$ to a central position on the completion of each movement, in order that the movements of the needles may be effected at the proper times. Again, since there must be but one movement of the cams $d$ and but one vibration of the escapement-fork for each movement of the cam-cylinder, it is evident that the eccentric $u$ must be fixed on a shaft, as B, which makes as many revolutions as the cam-cylinder makes complete reciprocations.

In order to keep the springs $m$ $m$ at a constant tension, the shaft G is turned forward as fast as the springs uncoil. This is effected by a pawl, $b^2$, which engages a ratchet, $q$, keyed on the shaft, the pawl being pivoted on the end of a lever, $b'$, which is loosely mounted on the shaft G, and the opposite end of which is connected by a link, $c'$, with a crank, $d'$, fast on shaft $t$. The shaft $t$ being oscillated by eccentric $u$ and spring $v$ through intermediate connections, $w\ x\ z$, every alternate movement of fork $o$ and oscillation of shaft $t$ will turn shaft G forward one step. By making the number of teeth on ratchet $q$ equal to the number of pins on the escapement-wheel $n$, the shaft G and the drums $e$ will evidently turn forward at the same speed, and a constant tension of the springs $m\ m$ will be maintained.

The pattern-drums $e$ must of course remain stationary during tubular knitting, as all the needles are then in operation. The rotation of the drums is prevented by pattern-chain H, the high links of which raise a lever-arm, 69, which is carried by shaft $t$, turning the shaft and the escapement-fork $o$ to the limit of their movement in that direction and holding them in that position, thus preventing the vibration of the fork, and consequently the rotation of the drums. When the end of tubular knitting is reached, and just before beginning the heel or toe, the high links pass out from under the lever-arm 69 and allow it to drop down, when the escapement-fork is free to vibrate, as already explained. The lever-arm 69 and the lever 67 being connected, as shown, and operated simultaneously by the pattern-chain H, it follows that the front needles are brought into action when the escapement is thrown out of operation, and that while the escapement is in operation the needles are held out of action.

The hub of lever 69 is loose on shaft $t$ and is capable of independent movement within certain limits. It is slotted internally, as shown at 693, in Fig. 18, Sheet 4, and the shaft has a feather, 694, set in it, the slot and feather being so adjusted to each other that when the arm is down the shaft can oscillate to effect the necessary vibration of the escapement-fork $o$; but when the arm is raised by the pattern-chain H one side of the slot will bear against the feather and will turn and hold the shaft and escapement-fork in inoperative position, as indicated in Fig. 17. This loose connection permits the shaft to oscillate without vibrating the arm.

We pass now to the consideration of the movements of the adjusting-cam 53, which are derived from the sleeve $f$, by which the pattern-drums $e$ are connected. The position of this cam while the machine is being driven by friction-cone 5 (the ratchet 41 being then out of gear) will not affect the motion of the machine; also, at the conclusion of the last reciprocating movement of the cam-cylinder this adjusting-cam must be instantaneously moved into position to trip the pawl of ratchet 41 at the proper time for stopping the machine. An extension, $e'$, of the sleeve $f$, Figs. 24 and 29 of Sheet 7, projects from the left-hand end of the left-hand drum, the parts $e'\ f$ and the two drums rotating together as one body. On the extension $e'$ is keyed a hub, $f'$, which has set in it a ring, $g'$, whose outer edge is formed into three inclined planes similar to those of the ring 92 for raising the jack-cylinder, and on these planes three pins, $l'$, bear, which project from a movable hub, $h'$. The hub $h'$ is loose on shaft G, and is capable of moving longitudinally thereon in a path defined by the horizontal guide $m^5$, which is bolted to the pattern-drum cover $b$, and which rests in a slot cut in the top of said hub $h'$. The hub $h'$ is forced toward hub $f'$ by a spring, $m'$, which surrounds the shaft G and has a bearing against a fixed collar, $n'$, on the end of said shaft. A curved or semicircular strap, $o'$, is bolted to hub $h'$, which strap has at its lowest part a downward-projecting pin, $o^{19}$, which enters a hole in and moves the back end of a lever, 55, Figs. 9 and 10, Sheet 1, and Fig. 2, Sheet 2, which is pivoted at 57, and whose other end is forked and is connected with the adjusting-cam 53. This lever is caused to move the adjusting-cam in the following manner: During the revolution of the drums $e$ and their connecting-sleeve $f$ the pins $l'$ rise gradually on the inclined planes of the ring $g'$ until they reach the tops of said planes, and during that time gradually force the hub $h'$ toward the left against the pressure of spring $m'$. When the pins have passed the tops of the inclined planes, the spring forces the hub $h'$ and the connected end of lever 55 back toward the hub $f'$, and thereby moves the cam 53, with which the forked end of the lever is connected, toward the left into the position for tripping the pawl of ratchet 41. There being three inclined planes, the hub $h'$ will be moved three times during a single revolution of the pattern-drums. The first two movements, however, produce no effect, because at these times the friction-cone 5 is still driving the machine, and ratchet 41 is consequently out of operation; but pattern-chain E is so formed as to throw friction-cone 5 out of gear before the completion of the heel or toe, leaving a portion of the last reciprocating movement of the cam-cylinder necessary to complete it to be effected by the ratchet 41. Hence, if the hub $f'$ be so set on the sleeve $e'$ that during the last reciprocating movement necessary to complete the heel or toe the hub $h'$ will be allowed to move toward the right, the cam 53 will immediately act to stop the machine at the proper point to permit the front needles to be lowered into action.

It will also be observed that as the pattern-drums remain at rest during the tubular knitting which follows the operations just described, at the close of said tubular knitting cam 53 will still be in position to trip the pawl of ratchet 41 and again stop the machine at the proper point to permit the front needles to be again raised out of action. The endwise thrust of the hub $h'$, of the hub $f'$, and of the sleeve $f$ is taken up by the ball-bearing $q'$, Fig. 26, Sheet 8, between a hub on the sleeve $f$ and the stationary bearing $r$, while the reverse thrust of the spring $m'$ on the fixed collar $n'$ is taken up by the fixed collar $p'$ on the opposite end of shaft G.

The automatic stop-off for stopping the supply of yarn when in heel and toe knitting the thread-guide passes the last needle which is in operation is shown in top plan in Fig. 30, Sheet 9, in front elevation in Fig. 31, Sheet 10, and in left-hand end elevation in Fig. 32, Sheet 11, and the devices for throwing it into and out of action are in part shown in right-hand end elevation in Fig. 17, Sheet 4. The stop-off consists, essentially, of two tension-plates, $f^2 g^2$, between which the yarn passes, being then led over a take-up spring, $u^2$, of the ordinary type and through the hollow top of the web-holder stem $z^2$ to the thread-guide 82. The plate $f^2$ is movable toward and from the plate $g^2$, the latter being fixed. While tubular knitting is progressing the plates $f^2$ and $g^2$ are separated to allow the yarn to feed freely; but during heel and toe knitting as soon as the thread-guide passes the last working-needle plate $f^2$ is moved up against plate $g^2$, thus nipping the thread and holding it until knitting again begins. It is evident that when the thread is thus stopped off some provision must be made to prevent the yarn between the stop-off and thread-guide from breaking while the cam-cylinder moves around to complete its stroke. To effect this, we employ a take-up spring, $u^2$, of the ordinary type, over which the yarn at all times passes in going from the stop-off to the thread-guide. While the yarn is stopped off this spring yields to the pull of the thread while the stroke is being completed and on the return-stroke retracts, thus taking up the slack until the stop-off releases the yarn and knitting again begins; hence while stopped off the yarn is always taut.

Inasmuch as the reciprocations of the thread-guide are of constant length, and as the length of each knitted course differs from that of the preceding one, it is evident that the time during which the yarn is stopped off must vary with each reciprocating movement. This is effected by the following mechanism: The stop-off is operated, primarily, by the shaft $r'$, which is driven by spur-gears 22 and $s'$ and intermediate pinion, $t'$. (See Fig. 2.) The gears 22 and $s'$ are of the same size; hence during reciprocating knitting shaft $r'$ will have an oscillating motion equal to and coincident with that of shaft D and the annular spur-gear 26, which, as before stated, is a little less than a full revolution. On shaft $r'$ is keyed a spiral cam, $u'$, which rises gradually from its lowest to its highest point, these two points being substantially in the same radial plane. Upon this cam rests the lower end of a vertical rod, $v'$, which works in suitable guides and is pressed down by a spring, $w'$. The upper end of the rod $v'$ is connected with a lever, $x'$, which vibrates in a vertical plane, and to the outer end of which is connected, through a connecting-rod, $y'$, a vertical rod, $z'$, which reciprocates in suitable guides. The upper end of rod $z'$ has a rectangular head with a vertical groove in its face, as shown in Fig. 31, in which the end of the roller-arm $b^2$ rests. At the center of this groove is a beveled depression, $a^2$, of definite length, into which the roller-arm $b^2$ falls during the movement of the head upward or downward. The outer end of the roller-arm $b^2$ is connected with a vertical lever, $c^2$, which is pivoted at $d^2$, and which has at its upper end a horizontal pivoted arm, $e^2$, that carries the stop-off plate $f^2$. The arms $b^2$ and $e^2$ work in horizontal guides $q^2 r^2$. The arm $b^2$ is held to the head of rod $z'$ by a spring, $C^{20}$, between the lever $c^2$ and the arm of guide $q^2$. Now, supposing the rod $v'$ to rest on the lowest part of cam $u'$ at the beginning of an oscillation of shaft $r'$ and on the highest part at the end of that oscillation and the beginning of the next, the rod $z'$ will, through the intermediate connections, be reciprocated through a space dependent on the radial distance between the two points on which the rod $v'$ rests at the beginning and end of an oscillation. During each reciprocating movement of rod $z'$ the arm $b^2$ will drop into the depression $a^2$, the lever $c^2$ will be vibrated, and the stop-off plate $f^2$ will be moved away from the plate $g^2$, and the thread will be free until the arm $b^2$ rises out of the depression at the opposite end; then the plate $f^2$ will move back and clamp the thread. Since the oscillations of shafts $r'$ and D are coincident with the reciprocations of the cam-cylinder, it follows that the head of rod $z'$ will be in its highest or lowest position at the end of each reciprocating movement of the cam-cylinder, and as the thread is unclamped during that part of each reciprocation when the needles are knitting it also follows that the length of the depression $a^2$ and the speed at which the rod $z'$ is reciprocated must depend on the number of needles in operation.

The length of the depression $a^2$ being fixed, we resort to the expedient of giving the rod $z'$ a variable speed and a variable length of reciprocation to compensate for the constantly-varying lengths of the courses. This is effected in the following manner: The lower end of the connecting-rod $y'$ is moved outward or inward in a slot, $h^2$, formed in the outer end of lever $x'$, the effect of which is to increase both the speed of movement and the length of reciprocation as the rod is moved outward and to diminish the same as it is moved inward. The outward movement, then, is equivalent to shortening the depression $a^2$ to correspond with the shortening of the courses during the narrowing operation, and the inward movement to lengthening it to correspond with the lengthening of the courses during the widening operation, the limits of inward and outward movement corresponding, respectively, with the longest and shortest courses. The inward and outward movements of the connecting-rod $y'$ are effected by a lever, $l^2$, pivoted at $m^2$, the upper end of said lever being connected with the rod $y'$ by a link, $n^2$, and its lower end bearing against an eccentric, $K^2$, which is keyed on the connecting-sleeve $f$ between the two pattern-drums $e$. A spring, $o^2$, holds the lever against the eccentric and draws the connecting-rod $y'$ inward. The eccentric being keyed to sleeve $f$, its motion will be coincident with that of the pattern-drums, and will, when properly adjusted, force the rod $y'$ outward to the limit of its movement and allow it to be drawn inward by the spring $o^2$ to the limit of movement in that direction during each revolution of the pattern-drums. In order to keep the center of the stroke of rod $z'$ constant, the slot $h^2$ is described in the arc of a circle whose center is coincident with the center of the connection between the rods $y'$ $z'$ when the lever $x$ is in the center of its oscillation, as shown in Fig. 32. The lever $x'$ is pivoted to the base of a standard, $p^2$, which supports also a yarn-holding frame of the ordinary type and the stop-off mechanism above described. The arm $e^3$, which carries the stop-off plate $f^2$, projects into and is thus guided by the hollow spindle of the opposite plate, $g^2$, which, as a precaution against the improper setting of the tension, is cushioned by a spring, $t^2$. The take-up spring $u^2$ is fixed to the rear stationary part of the yarn-holding frame. As the oscillation of shaft $r'$ is less than a full revolution, the end of the vertical rod $v'$ will not at either end of the stroke strike or fall over the radial edge of the cam $u'$.

It will be observed that if the machine be so geared that the cam-cylinder will make two movements or one complete reciprocation while the shaft $r'$ makes one oscillation a simple eccentric can be used in place of the spiral cam $u'$, as the eccentric during a full oscillation of the shaft will give an upward and a downward movement to the rod $z'$.

If the machine be arranged to knit a plain straight web—i. e., one in which the reciprocating courses are all of equal length—the connecting-rod $y'$ will be adjusted permanently on the lever $x'$ to correspond with the width of the same, and the mechanism for moving it in and out will be dispensed with; or should it be so arranged as to knit a web of irregular width—i. e., one in which the reciprocating courses are neither all of the same length, nor in which do they increase or decrease regularly, as in a "square" heel or toe—the cam $u'$ (or the eccentric, which, as above stated, may under certain circumstances be substituted for it) will be so shaped as to be capable of giving a maximum lift which will produce the maximum stroke required of the rod $z'$, and the eccentric $K^2$ will be replaced by an irregular cam so shaped as to produce the necessary length and speed of reciprocation of the said rod to effect the stop-off at the proper time in each course of the said irregular web.

The holder for holding the web during heel and toe knitting is shown in top plan in Fig. 30, in front elevation in Fig. 31, and in left-hand end elevation in Fig. 33; and the elastic plunger which forms a part of said holder is shown in semi-vertical section in Fig. 35 and in semi-plan in Fig. 34, Sheet 9. It consists, essentially, of a plunger, the diameter of whose head or piston can be varied, faced with yielding material. This plunger is made to descend into the needle-cylinder and hold the web during one-half of each reciprocating movement of the cam-cylinder, and then to rise for the next stroke. The head has its maximum diameter when descending, but in entering the flaring mouth of the needle-cylinder it is compressed and reduced to the minimum diameter, and remains in this condition until near the completion of its upward movement, when it is permitted to expand ready for the next operation. The head of the plunger being of larger diameter in its expanded condition than the interior of the needle-cylinder, it will, while being compressed, press the web tightly against the walls of the flaring mouth of the cylinder and will drag down the loose web and hold it while a course is being knitted. As shown in Figs. 31, 33, and 34, the plunger consists of a vertical stem, $z^2$, and a head comprising a base-plate, $v^2$, which has radial grooves in its upper face to receive and hold the arms $w^2$, which at their outer ends have curved or rounded heads $w^4$. These heads $w^4$ are faced with elastic material, (preferably soft rubber.) The arms $w^2$ are pressed out by a spiral band-spring, $x^2$, which occupies a circumferential groove or recess in a sleeve or collar, $y^2$, that surrounds the lower end of the stem $z^2$ and is capable of slight vertical movement thereon. Its base rests in a recess in the base-plate $v^2$, the depth of said recess being equal to or greater than the thickness of the base-flange of the collar. A circular projecting flange, $b^3$, on the cap $a^3$ enters elongated notches or recesses in the upper sides of the arms $w^2$ and serves as a stop to limit their outward movement. The inner ends of the arms $w^2$ are beveled and notched on their under sides, as shown in Figs. 33 and 35 at $d^3$, and the base-flange of sleeve or collar $y^2$ is similarly beveled and notched to engage and hold the arms when they are pressed inward. A spring, $c^3$, under the collar presses it up to effect its engagement with the arms.

On the stem $z^2$, immediately above the cap $a^3$, is a fixed collar, $h^3$, with a ball-bearing, $h^{31}$, between, and below the base-plate $v^2$ is a washer, $k^3$, secured by a nut, $l^3$, on the extreme lower end of the stem. The head is secured on the stem by the fixed collar $h^3$ above and the washer and nut below, and is capable of turning on the stem, for a purpose to be hereinafter explained. The sleeve or collar $y^2$ is connected by four small bolts, $f^3$, which pass through the cap $a^3$, with a flat ring, $g^3$, which surrounds the stem above the fixed collar $h^3$. The operation of this plunger is as follows: When the head descends into the flaring mouth of the needle-cylinder, the heads $w^4$ and arms $w^2$ are pressed inward by the flaring wall against the spring $x^2$, and the beveled ends of the arms ride upon the beveled flange of the sleeve or collar $y^2$ and press the latter down against the force of its spring $c^3$. As soon as the vertical sides of the notches $d^3$ pass the vertical side of the annular notch in the base-flange the spring $c^3$ throws the sleeve or collar $y^2$ upward to the limit of its movement, when said base-flange and the arms $w^2$ are interlocked, and the latter are retained in their retracted positions until in the upward movement of the plunger the pins $f^3$ or the ring $g^3$ strike the fork of the standard 83 and are pressed down against the force of the spring $c^3$, whereby the arms $w^2$ are freed and are permitted to be pressed out by the spring $x^2$ to the limit of their movement, when the holder is ready for another stroke. Thus, when the upward stroke begins, the plunger will be in its compressed condition and will free itself from the web without raising the latter with it.

It will be noted that the vertical stroke of the plunger is of a length just sufficient to permit the pins $f^3$ on ring $g^3$ to strike the fork of standard 83 and release the arms.

The vertical stem $z^2$ is polygonal (preferably hexagonal) in cross-section from the collar $h^3$ to within a short distance of its upper end, and is embraced by a fork on the inward-bent upper end of standard 83, which is attached to and moves with the cam-cylinder 29. The stem is capable of moving vertically through the fork, but is so closely embraced by the latter that it cannot turn therein; hence it must partake of the reciprocating movements of the cam-cylinder to which the standard of the fork is attached. The upper end of the stem is made hollow, and the yarn is led from the tension device downward through said hollow part and out through a side opening, $n^3$, to the thread-guide 82. The spindle $z^2$ of the web-holder then has two motions—first, a rotary reciprocating or oscillating motion to keep the opening $n^3$ always opposite the thread-guide, and, second, a vertically-reciprocating motion by which the web is held and released at the proper times. It is vertically guided by an arm, $o^3$, through which it passes, and which is capable of turning and of moving up and down on a vertical standard, $p^3$. The stem is secured in said arm by upper and lower fixed collars, $r^3$ $q^3$, and the arm is supported on the standard $p^3$ by a spiral spring, $v^3$, which surrounds the standard.

Between the upper fixed collar, $r^3$, and the arm $o^3$ is a loose collar, $s^3$, which has horizontally-projecting arms or pins, the latter forming bearings for the arms of a horizontal fork, $t^3$, carried by a vertical reciprocating rod, $u^3$, the upper end of which is guided by an arm of standard $p^2$, and the lower end of which, passing through the table of the machine, rests on a cam, $x^3$, keyed on the oscillating shaft $r'$. A spring, $w^3$, between the table and a shoulder on the lower end of the rod $u^3$ presses the latter down upon the cam. The rod $u^3$ is then reciprocated by the action of the cam $x^3$ and the spring $w^3$. In its downward movement it depresses, through the forked arm $t^3$, the web-holder, which, as soon as the rod is raised by the cam, is also raised by the action of the spring $v^3$. Inasmuch as the web-holder is in its holding position while each course is being knitted, during which time it must remain stationary, and inasmuch as the stem $z^2$ must turn with the cam-cylinder in order to keep the opening $n^3$, through which the thread passes, always opposite the thread-guide, the spindle $z^2$ and its holding-head are united by a swivel-connection, so as to allow the stem to turn within the head while the latter is in its holding position.

The cam $x^3$ is shaped substantially as represented in Fig. 33—that is to say, with its cam portion on one side of a line passing transversely through the axis of its shaft, and with the portion on the opposite side of said line concentric with said axis—so that during one quarter of an oscillation of the shaft the web-holder will rise, during the second quarter it will fall, and during the remainder will remain stationary; hence, the oscillations of the shaft $r'$ being coincident with the reciprocations of the cam-cylinder, and the longest courses in heel and toe knitting being knitted during one-half (more or less) of a reciprocation of the cam-cylinder, it must follow that the holder will always be in holding position while the needles are knitting, it being of course understood that the concentric part of the cam $x^3$ is arranged upon that side of its shaft which corresponds with that half of the reciprocation of the cam-cylinder when knitting is progressing.

The standard $p^3$ is movably supported in a guideway, $a^7$, on the table of the machine, and is capable of being moved back therein when it is desired to disconnect the web-holder from the forked arms at the end of reciprocating knitting or at any other time. The standard is held in operative position in its guideway by a spring-actuated pin, $b^6$. At the close of reciprocating knitting the cam-cylinder is stopped in the position indicated in Fig. 30 with the fork of standard 83 opening directly toward the standard $p^3$ and in the line of the guideway $a^6$. Then by depressing the arm $o^3$ the connection between the stem $z^2$ and the forked arm $t^3$ will be broken, and the standard $p^3$, and with it the web-holder, may be moved back out of operative position and clear of the needle-cylinder during tubular knitting.

Both the yarn stop-off and the web-holder are thrown into and out of operation in the following manner: At the left-hand side of lever-arm 69, and connected with the latter, is a rod, $y^3$, the upper end of which is connected with a lever, $a^4$, fulcrumed at $b^4$ in a bracket or hanger on the under side of the table. The opposite end of lever $a^4$ is connected by a link, $c^4$, with a lever, $d^4$, which is fulcrumed at $e^4$ on the base of the standard $p^2$. The front end of lever $d^4$ is forked and grasps pins projecting from opposite sides of an oblong collar, $f^4$, which encircles loosely the vertical rods $v'$ $u^3$, the former of which is connected with and operates the stop-off mechanism, and the latter the web-holder, as before explained. Both of these rods have fixed collars or shoulders $g^4$ $h^4$ at such a distance above the loose collar $f^4$, which normally rests upon the table, as to permit their necessary vertical movements, as above explained. When the lever-arm 69 is thrown up by pattern-chain H, the forked end of lever $d^4$ will, through the connections $y^3$, $a^4$, and $c^4$ raise the loose collar $f^4$ and lift the rods $v'$ and $u^3$ by their fixed collars or shoulders $g^4$ $h^4$ clear of the operating-cams $u'$ and $x^3$, and hold them in this inoperative position during tubular knitting. At the end of tubular knitting the pattern-chain H permits the lever-arm 69 to fall, thereby returning the connected parts to the position for heel and toe knitting, as represented in Figs. 31 and 32.

The means for releasing the hold of the jacks on the needles when it is desired to remove the needle-cylinder and its needles are shown in Figs. 36 and 37, Sheet 13. As before stated, the needle-cylinder is, when in place, securely fastened to the jack-cylinder by the three flanged grip-pieces 90, which together form an annular cylinder, and whose sides or meeting edges are beveled or inclined at an angle of about forty-five degrees, as shown at $K^4$, Fig. 36, to prevent them from catching or interfering with the rise or fall of the jacks in their grooves. The grip-pieces are suspended by their flanges $l^4$ on the spring grip-band 91, which is supported by two vertical standards, 66 and $m^4$, which rise from the base of the jack-cylinder 57, the object in thus supporting them being to raise the gripping-gear, with the cylinders, when the latter are raised to tighten the web. A solid guard-band, $n^4$, which acts as a guide for the jacks in their vertical movements, also surrounds the jack-cylinder and its jacks below the gripping-pieces 90. The grip-band 91 is tightened or slackened by the partial rotation of a rod or shaft, $o^4$, which has a right and left hand screw at its center, where it passes through the outturned ends of the band. This rod $o^4$ is turned by crank-arms $p^4$, which have slots at their ends to receive pins $q^4$ at opposite sides of the guard-band $n^4$. The arms of a horizontal fork, $r^4$, are also coupled with the pins $q^4$, said fork being capable of being raised and lowered by a vertical rod, $s^4$, which passes through the table and is connected above the latter with hand-lever 762, by which it is operated.

A thin band-spring, $t^4$, is set in a circular space formed around the outer surface of the jack-cylinder by cutting a slot in the inner sides of the plates which are set in said cylinder to form guide-grooves for the jacks, said spring being so secured to the cylinder as to permit it to expand and exert a constant outward pressure on the jacks. The jacks are cut out on their inner sides at $u^4$ to form spaces for the spring $t^4$ between them and the cylinder and to allow the jacks to be raised and lowered while pressed against the cylinder by the guard-band $n^4$.

While knitting, the rod $s^4$ and its attached fork $r^4$, together with the guard-band $n^4$, are raised to the position shown in Fig. 13, in which position the guard-band will press and hold the upper ends of the jacks against the cylinder in operative position. At the same time the crank-arms $p^4$ are raised and the rod $o^4$ turned to cause its right and left hand screw to tighten the grip-band 91 and clamp the gripping-pieces 90 and secure the needle-cylinder upon the jack-cylinder. When the needle-cylinder is to be removed, the rod $s^4$, the fork $r^4$, and the guard-band $n^4$ are lowered to the position shown in Fig. 36, the arms $p^4$ are turned down to loosen the grip-band 91, and the gripping-pieces 90 are unclamped. When the guard-band is lowered below the spring $t^4$, the latter presses the upper ends of the jacks out to disengage them from the needle-butts, as shown. The needle-cylinder, with its needles, is then free to be removed.

The inner lower corners of the jacks are rounded to allow them to turn out freely without binding against the cylinder. The jacks 60 of the variably-operative needles turn on the pins by which they are connected with the levers 96, and the jacks 59, which are carried by the jack-holder 61, turn on the depending knife-edge flange of the cap 63. The vertical movements of the guard-band $n^4$ are limited by the gripping-pieces and by a lug, $u^5$, on the standard 66. The parts being in the positions indicated in Fig. 36, the needle-cylinder, with its needles, is free to be removed in the usual manner. Improved mechanism for effecting this removal with ease and facility will form the subject-matter of a future application for Letters Patent.

It is desirable to state, and it will be understood from the foregoing description, that the pattern or cam chains E, H, and K can be so formed and arranged as to knit a stocking beginning at the toe. While preferring the method before described, it is not wished to consider it limited thereto.

Having thus described our invention, we claim as new—

1. The combination of an escapement by which the mechanism is controlled during reciprocating knitting, a jack-holder which carries the jacks of the needles which are out of action during reciprocating knitting, a connection between the shaft of the escapement-fork and the jack-holder, and a cam to lock the escapement and to lower the jack-holder and bring the needles controlled thereby into action for circular knitting, substantially as shown and described.

2. The combination of two parallel crank-shafts with the cam-cylinder, gearing between one of said crank-shafts and the cam-cylinder, and a rod connecting the two cranks, the crank of the shaft which is in gear with the cam-cylinder being adjustable in length, as and for the purpose described.

3. The combination, with a series of needles, of jacks co-operating therewith, as described, a jack-holder connected with the jacks of that portion of the series of needles which is thrown out of action prior to narrowing and widening, pattern devices connected with the jacks of those portions of the series of needles which are thrown out of and into action during narrowing and widening, said pattern devices having an escapement for controlling the movement thereof, as described, a connection between the shaft of the escapement-fork and the jack-holder, and a cam to lock the escapement-fork in fixed position and to lower the jack-holder, substantially as shown and described.

4. The shafts B C, the cam-cylinder, gearing between said cylinder and shaft C, as shown and described, cranks 12 14 on said shafts, and a connecting-rod, 13, between said cranks, through which motion is transmitted from one shaft to the other, in combination with an auxiliary driving-gear, 15 16 17, substantially as and for the purpose described.

5. The shafts B C, the cam-cylinder and gearing between the shaft C and the cam-cylinder, cranks 12 14 on said shafts, and a connecting-rod, 13, which connects said cranks, and through which motion is transmitted from shaft B to shaft C, the crank-pin of crank 14 being movable toward and from the shaft C in a slot which is described from the center of the pin of crank 12 when the cranks are parallel and stand in the same direction.

6. The combination of two parallel shafts having crank-and-pitman connection, through which motion is transmitted from one to the other, the crank on the driven shaft being adjustable in length, auxiliary gear 15 16 17 between said shafts, which is capable of being thrown into and out of action, and devices, substantially as described, whereby the crank is lengthened and shortened and the auxiliary gear thrown out of or into action simultaneously, substantially as shown and described.

7. The combination of a main or driving shaft carrying two unequal gears, 8 9, which are capable of independent rotation, and each of which carries one part of a clutch, and a driven shaft also carrying two unequal gears, which are fast thereon, and which mesh with the loose gears of the driving-shaft, with a double-clutch member, by which either of said gears may be made fast, and a cam and intermediate devices for shifting said clutch, substantially as and for the purpose described.

8. The combination, with the cam-cylinder having upper and lower fixed cams, of side cams or switches arranged at opposite sides of the upper and lower cams and coupled together and capable of horizontal movement to change the cam-path during reciprocating knitting, substantially as shown and described.

9. The combination, with the cam-cylinder having upper and lower fixed cams, of side cams or switches arranged at opposite sides of said upper and lower cams and coupled together and capable of horizontal movement to change the cam-path, and holding-springs to prevent accidental shifting of the switches, as and for the purpose described.

10. The combination, with the cam-cylinder having upper and lower cams, of an annular driving-gear connected therewith, with capacity for lost motion between the gear and the cam-cylinder, and side cams or switches connected and moving with the driving-gear to change the cam-path by the independent movement between said gear and cam-cylinder, substantially as shown and described.

11. The combination, with the cam-cylinder having upper and lower cams, of an annular driving-gear connected therewith, with capacity for lost motion between the gear and the cam-cylinder, side cams or switches connected and moving with said driving-gear, and a thread-guide connected and moving with the cam-cylinder to maintain a proper relation between the cam-path and thread-guide, substantially as shown and described.

12. The combination, with the cam-cylinder having upper and lower fixed cams, of side cams or switches arranged at opposite sides of said upper and lower cams and capable of horizontal movement to change the direction of the cam-path for reciprocating knitting, substantially as shown and described.

13. The combination, with the jack-cylinder and with the needle-cylinder resting thereon, of a gripping mechanism which covers the joint and grips and binds the two cylinders together, substantially as shown and described.

14. The combination, with the jack-cylinder and with the needle-cylinder resting thereon, of a gripping mechanism consisting of a divided ring which covers the joint between said cylinders, and a gripping-band surrounding said divided ring and adapted to clamp the parts together, substantially as shown and described.

15. The combination, with the jack-cylinder and with the needle-cylinder resting thereon, of a gripping mechanism which covers the joint between said cylinders and binds the two together, said gripping mechanism being supported from the base of the jack-cylinder, substantially as shown and described.

16. The combination, with the jack-cylinder and with the needle-cylinder resting thereon, of a gripping mechanism consisting of a divided ring which covers the joint between said cylinders, a gripping-band surrounding said ring, a right and left hand screw-rod which passes through the ends of said band, and a vertically-movable fork which is connected with arms on said screw-rod, substantially as shown and described.

17. The combination, with the jack-cylinder and with the needle-cylinder resting thereon, of a gripping mechanism which covers the joint between said cylinders and binds the two together, and a guard-ring to hold the jacks in place, said gripping mechanism and guard-ring being connected, substantially as shown and described, whereby the lowering of the guard-ring to allow the jacks to release the needles and the release of the gripping mechanism are simultaneously effected.

18. A jack constructed as herein shown and described, with an upper interior space for the needle-butt and with a lower interior space, $u^4$, substantially as shown and described.

19. The combination, with the jack-cylinder and its jacks, of a vertically-movable guard-band, means to raise said band and to lower the same to release the needle-butts, and an annular spring between the cylinder and jacks to throw the latter out when the guard-band is lowered, substantially as shown and described.

20. The combination, with the yarn stop-off consisting of two clamping-plates, $g^2$ $f^2$, one of which is stationary and the other movable toward and from the first, of a vibrating lever with which the movable plate is connected, a reciprocating cam of variable stroke by which the lever is vibrated, and means, substantially as shown and described, for imparting a stroke of variable extent to said cam, whereby the lever is vibrated and the time at which the yarn is clamped between the plates $f^2$ $g^2$ is varied to suit the number of needles in operation during each course of knitting while narrowing and widening, substantially as shown and described.

21. The combination, with the yarn stop-off consisting of a fixed and a movable plate, $g^2$ $f^2$, of a vibrating lever with which the movable plate is connected by a rod, $b^2$, a reciprocating cam by which said lever is vibrated, a horizontal lever, $x'$, a connection between said reciprocating cam and the lever $x'$, capable of being shifted toward and from the pivot of the latter, and means for vibrating the lever $x'$, substantially as shown and described.

22. The combination, with the reciprocating rod $z'$, the lever $x'$, said rod and lever having an adjustable and movable connection, the cam $u'$, and a connection between said cam and the lever $x'$, whereby the latter is vibrated and the rod $z'$ reciprocated, of the lever $l^2$, coupled to the adjustable connection between the rod $z'$ and lever $x'$, the rotating shaft G, and a cam or eccentric on the shaft G, whereby the point of connection with the lever $x'$ is moved and adjusted to regulate the length and speed of the reciprocations of the rod $z'$, substantially as and for the purpose described.

23. The combination, with the yarn stop-off mechanism, constructed and operating substantially as described, of a pattern or cam chain, H, a rotating drum carrying the same, and a system of levers and connecting-rods operated by said chain to lift the stop-off mechanism out of operative position during circular knitting and to lower it into operative position during reciprocating knitting, substantially as shown and described.

24. The combination, with the needle-cylinder and needles, of a web-holder having yielding fabric-engaging portions adapted to be inwardly compressed upon coming in contact with the fabric lying against the interior surface of the cylinder, and having locking devices for holding the yielding portions in their compressed position until after the web-holder has been raised from the cylinder, and means for reciprocating the web-holder.

25. The combination, with the needle-cylinder and needles, of a vertically-reciprocating web-holder having radial arms with segmental heads at their outer ends, a spring to press said arms and segmental heads outward, a spring-actuated catch for engaging and holding the arms when pressed inward, and a fixed stop to disengage the said catch and release the arms during the upward movement of the holder, substantially as shown and described.

26. The combination, with the needle-cylinder and needles, of a vertically-movable spring-supported web-holder, a cam, $x^3$, and a vertically-movable spring-pressed rod, $u^3$, resting on said cam and connected by an arm, $t^3$, with the web-holder, whereby when the rod $u^3$ is lifted by the cam the web-holder is free to be raised by its spring, and when the highest point of the cam is passed the rod $u^3$ is pressed down by its spring and the web-holder is depressed, substantially as shown and described.

27. The combination, with the needle-cylinder and needles, of a vertically-movable web-holder adapted to enter the cylinder and press down and hold the web, and having a hollow stem with a side opening, $n^3$, opposite the thread-guide, with the cam-cylinder, the thread-guide carried by said cylinder, and a forked standard, 83, which embraces the stem of the web-holder and turns the same with the cam-cylinder, substantially as and for the purpose described.

28. The combination, with the power-shaft, the cam-cylinder, and the main system of gearing whereby said cylinder is driven from the power-shaft, of a clutch mechanism to throw said system of gearing into and out of connection with the power-shaft, and auxiliary driving mechanism connected with the power-shaft, and a cam and intermediate devices whereby said auxiliary driving mechanism is placed in operative condition when the clutch mechanism is operated to disconnect the main system of gearing from direct connection with the power-shaft, and whereby it is rendered inoperative when the clutch mechanism is operated to place the main system again in operative connection with the power-shaft, substantially as shown and described.

29. The combination, with the power-shaft, the cam-cylinder, and the system of gearing by which the cam-cylinder is driven from the power-shaft, of a clutch mechanism for throwing said gearing into and out of connection with the power-shaft, an auxiliary driving mechanism connected with and operated by the power-shaft, a movable cam, 49, and intermediate devices whereby said auxiliary driving mechanism is placed in operative condition when the clutch mechanism is operated to disconnect the main system of gearing from direct connection with the power-shaft, and whereby it is rendered inoperative when the clutch mechanism is operated to place the main system again in operative connection with the power-shaft, substantially as shown and described.

30. The combination, with the cam-cylinder, the system of gearing by which it is driven, and the power-shaft A, of a clutch mechanism for throwing said system of gearing into and out of connection with the power-shaft A, and an auxiliary driving mechanism consisting of an eccentric on the power-shaft, a pawl-and-ratchet mechanism on the driven shaft B, and a connection between shaft B and the main shaft of the system of driving-gear, substantially as shown and described.

31. The combination, with the power-shaft, the shaft B, the auxiliary driving-gear consisting of an eccentric on the power-shaft, a pawl and ratchet on the driven shaft B, the cam-cylinder, and devices whereby motion is imparted to the cam-cylinder from the shaft B, of a tripping-shield, 43, and a cam and intermediate devices to operate said shield for throwing the said pawl and ratchet out of action when the cam-cylinder is in proper position for raising and lowering the needles which are out of action during reciprocating knitting, substantially as shown and described.

32. The combination, with shafts A and B, the eccentric 42 on shaft A, a pawl-and-ratchet mechanism on shaft B, and an operative connection between the eccentric and the pawl-and-ratchet mechanism, of a lever, 44, carrying a shield, 43, which, when the lever is turned, is interposed between the pawl and ratchet to throw the latter out of action, and a cam, 53, devices for moving said cam into and out of operative position, and devices intermediate the cam and lever 44 for operating the latter under the control of the cam, substantially as and for the purpose described.

33. The combination, with the needle and jack cylinders and with the needles and jacks, of movable pattern-cams and levers 96 99, connected at adjoining ends to form compound levers, one element of each of said compound levers being connected with a jack and the other being operated by a movable cam, and the jacks and needles being connected by loose or sliding connections, whereby the needles are positively moved into and out of action.

34. The combination, with the power-shaft, the cam-cylinder, the system of gearing by which the cam-cylinder is driven from the power-shaft, and a clutch mechanism by which said system of gearing is thrown into and out of connection with the power-shaft, of an auxiliary driving mechanism consisting of a pawl and ratchet, 41 41$^a$, and connections whereby said pawl is operated from the power-shaft, a cam in connection with the said clutch mechanism, and devices operated by said cam whereby the pawl is thrown into operation when the clutch is inactive and out of operation when the clutch is active, substantially as and for the purpose described.

35. The combination of an escapement, a jack-holder, a connection between the jack-holder and the escapement, and a cam or pattern chain to simultaneously lower the jack-holder and lock the escapement or to raise the jack-holder and release the escapement, substantially as shown and described.

36. The combination, with the needles and needle-actuating mechanism, of movable cams and devices intermediate the said cams and the needles for throwing the needles into and out of action, an escapement-wheel connected with said cams, the supporting-shaft of said wheel and cams, a spring between said connected cams and wheel and the supporting-shaft, the escapement-fork, means for vibrating said fork, and a winding mechanism connected with and operated by the escapement-fork or its shaft to turn the shaft and maintain the tension of the spring, substantially as shown and described.

37. The combination, with the power-shaft, the cam-cylinder, the system of gearing by which the cam-cylinder is driven from the power-shaft, and a clutch mechanism by which said system of gearing is thrown into and out of gear with the power-shaft, of an auxiliary driving mechanism consisting of pawl and ratchet 41 41$^a$ and devices whereby said pawl is operated from the power-shaft, a cam in connection with the clutch mechanism, and devices operated by said cam by which the pawl is thrown into operation when the clutch is thrown out of gear and thrown out of operation when the clutch is thrown into gear, and a tripping mechanism consisting of a cam, 53, and tripping devices under the control of said cam to throw the auxiliary driving mechanism out of action and stop the cam-cylinder at the proper point for raising or lowering the front needles, substantially as shown and described.

38. The combination, with the needles, jacks, and connected levers, of a rotating pattern-drum having actuating-cams upon its surface to actuate the levers, and an escapement-wheel connected with said drum to control the rotation thereof, an escapement-fork, and means for vibrating said fork, the connected levers standing at an angle to each other and loosely connected to allow them to separate, substantially as described.

39. The combination, with the needles, jacks, and connected levers, of a rotating pattern-drum having cams upon its cylindrical surface to actuate the levers, jacks, and needles to throw the latter into and out of action in proper order, said drum being connected to its shaft by one or more interposed springs, means for rotating the shaft, and escapement devices to control the movement of the drum, substantially as and for the purpose described.

40. The combination, with the needle-cylinder, of a series of needles, a pattern drum or drums having cams upon the surface thereof arranged to raise and lower a portion of the needles out of and into action in predetermined order, a series of jacks corresponding with said portion of the needles, connecting-levers between said drums and jacks, a vertically-movable jack-holder carrying a series of jacks and controlling a second portion of the series of needles which is capable of being thrown out of and into action in a body, and means for raising and lowering said jack-holder, substantially as and for the purpose described.

41. The combination, with the series of needles, jacks, and levers, arranged and connected as described, of a pattern-drum, $e$, having cams upon its surface arranged to raise and lower the needles in proper order, said drum being connected to its shaft by an interposed spring, an escapement to control the movement of the drum, having a fork and means to vibrate said fork, and a winding mechanism connected with the escapement-fork and arranged to turn the shaft of the drum, substantially as shown and described.

42. The combination, with a series of needles and a series of jacks in engagement with the butts thereof, of a vertically-movable jack-holder on which the series of jacks is pivotally mounted, the jacks being adapted to be swung outward to disengage them from the needles.

43. The combination, with the cam-cylinder, needles, and jack-cylinders, and with the needles and jacks, of levers for moving the jacks and needles, cams for producing the required motion of said levers at predetermined times, and an escapement to control the action of the cams, substantially as and for the purpose described.

44. The combination, with the driving-shaft and the cam-cylinder, of two parallel shafts located between the cam-cylinder and the driving-shaft, an expanding crank or arm of variable radius, a crank or arm of fixed radius, a link-connection between said cranks or arms, gearing between one of said shafts and the cam-cylinder, and gearing between the other of said shafts and the driving-shaft, substantially as shown and described.

45. The combination, with the yarn stop-off consisting of fixed and movable plates $f^2 g^2$, lever $c^2$, and rods $e^2 b^2$, of a reciprocating cam by which one of said plates is moved, a horizontal lever, $x'$, a connection between said reciprocating cam and the lever $x'$, capable of being shifted toward and from the pivot of the lever, a cam or its described equivalent, and a coacting spring and a rod interposed between said cam and lever for vibrating the lever $x'$, substantially as and for the purpose described.

46. The combination, with the needle-cylinder and needles, of a vertically-reciprocating web-holder having radial spring-pressed arms with curved or segmental heads at their outer ends, the whole forming a circular head whose normal diameter is greater than the interior diameter of the needle-cylinder, and which is capable of being compressed and reduced in diameter by the reaction of the flaring walls of the mouth of said cylinder, a spring-actuated catch to engage and hold the radial arms when the head is compressed, and a fixed stop to trip said catch and release the arms during the upward movement of the holder, substantially as shown and described.

47. The combination, with the cam-cylinder and a series of needles, each having an outwardly-extending projection for engagement with the cam portions of said cam-cylinder, and an additional outwardly-extending projection, of a series of jacks adapted for engagement with the said additional projections on the needles to move the latter into and out of operative position, a ring for holding the jacks in position for engagement with the needles, operating devices for the jacks with which the latter have a pivotal connection, and a spring for throwing the upper ends of the jacks outward and disconnecting them from the needles when the retaining-ring is depressed, substantially as shown and described.

48. The combination, with the needle and jack cylinders and with the needles and jacks, of a retaining-ring to hold the jacks in engagement with the needles, and a spring-ring for throwing the jacks outward and disengaging them from the needles when the retaining-ring is depressed, substantially as shown and described.

49. The combination, with the cam-cylinder, needle and jack cylinders, and needles and jacks, of levers for moving the jacks and needles, cams for operating the said levers at predetermined times, an escapement and escapement-fork to control the action of the cams, and a winding mechanism connected with and operated by the escapement-fork or its shaft, substantially as shown and described.

In testimony whereof we affix our signatures in presence of two witnesses.

WILLIAM CATHCART,
*Administrator of Estate of Gilbert J. Cathcart, deceased.*
WILLIAM L. CATHCART.

Witnesses:
D. OGDEN ROGERS,
GEO. W. ROGERS.